US010525850B1

(12) United States Patent
Tang et al.

(10) Patent No.: US 10,525,850 B1
(45) Date of Patent: Jan. 7, 2020

(54) AUTOMATIC VEHICLE CONFIGURATION BASED ON SENSOR DATA

(71) Applicant: Capital One Services, LLC, McLean, VA (US)

(72) Inventors: Qiaochu Tang, The Colony, TX (US); Geoffrey Dagley, McKinney, TX (US); Avid Ghamsari, Frisco, TX (US); Micah Price, Anna, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/528,040

(22) Filed: Jul. 31, 2019

(51) Int. Cl.
*B60N 2/02* (2006.01)
*B60W 40/08* (2012.01)
*B60R 16/037* (2006.01)
*B60H 1/00* (2006.01)

(52) U.S. Cl.
CPC ....... *B60N 2/0248* (2013.01); *B60H 1/00971* (2013.01); *B60R 16/037* (2013.01); *B60W 40/08* (2013.01); *B60W 2040/0809* (2013.01); *B60W 2040/0872* (2013.01); *B60W 2550/12* (2013.01)

(58) Field of Classification Search
CPC .............. B60N 2/0248; B60H 1/00971; B60R 16/037; B60W 40/08; B60W 2550/12; B60W 2040/0809; B60W 2040/0872
See application file for complete search history.

(56) References Cited

U.S. PATENT DOCUMENTS

| 8,103,414 | B2 | 1/2012 | Boss et al. |
| 10,332,245 | B1 * | 6/2019 | Price ..................... G06T 7/0002 |
| 2015/0202962 | A1 * | 7/2015 | Habashima ............ B60K 35/00 345/633 |
| 2018/0322342 | A1 * | 11/2018 | Clifford .................... G06T 7/11 |
| 2019/0244042 | A1 * | 8/2019 | Yang .................. G06Q 30/0282 |
| 2019/0291719 | A1 * | 9/2019 | Tiziani ................ B60W 30/025 |

* cited by examiner

Primary Examiner — Mary Cheung
(74) Attorney, Agent, or Firm — Harrity & Harrity, LLP

(57) ABSTRACT

A vehicle receives sensor data that includes image data of frames that depict one or more individuals outside of the vehicle, and identifies, by analyzing the sensor data using one or more attribute recognition techniques, a set of attributes of an individual of the one or more individuals. The vehicle determines a set of scores indicating a set of likelihoods of a set of vehicle configurations being a preferred vehicle configuration for the individual, based on a data model performing a machine-learning-driven analysis of attribute data identifying the set of attributes, and/or location data identifying a location of the individual relative to the vehicle. The vehicle selects a particular vehicle configuration based on a score that indicates a likelihood of the particular vehicle configuration being the preferred vehicle configuration and provides an instruction to cause a vehicle component to implement the particular vehicle configuration by updating a configurable value.

20 Claims, 11 Drawing Sheets

US 10,525,850 B1

AUTOMATIC VEHICLE CONFIGURATION BASED ON SENSOR DATA

BACKGROUND

A vehicle may include a set of vehicle components that have traditionally been manually controlled by human users, such as a vehicle door, a vehicle seat, a vehicle trunk, a vehicle radio, a vehicle temperature control unit, and/or the like. In some cases, the vehicle may also include a set of cameras that may be used for various purposes. For example, the vehicle may include cameras attached to a back portion of the vehicle and/or to a front portion of the vehicle to assist a driver in parking the vehicle, side-vehicle cameras for detecting blind spots of the driver, and/or the like.

SUMMARY

According to some implementations, a method may include obtaining, by a processor on-board a vehicle, sensor data that includes image data that depicts one or more individuals that are outside of the vehicle. The method may include identifying, by the processor and by analyzing the image data using a target recognition technique, one or more sets of pixels that are associated with the one or more individuals. The method may include identifying, by the processor and by using one or more attribute recognition techniques to analyze the one or more sets of pixels, a set of attributes of an individual of the one or more individuals. The method may include determining, by the processor, a set of scores indicating a set of likelihoods of a set of vehicle configurations being a preferred vehicle configuration for the individual. The determination may be based on a machine-learning-driven analysis of at least one of: attribute data that identifies the set of attributes of the individual, or location data that identifies a location of the individual relative to the vehicle. The method may include selecting, by the processor, a particular vehicle configuration, of the set of vehicle configurations, based on a score that indicates a likelihood of the particular vehicle configuration being the preferred vehicle configuration for the individual. The method may include causing, by the processor, a vehicle component to update a configurable value to implement the particular vehicle configuration.

According to some implementations, a system may include one or more memories, and one or more processors, operatively coupled to the one or more memories and a set of sensors, to receive a data model that has been trained to perform a machine-learning-driven analysis of vehicle configurations of a vehicle. The one or more processors may receive, from the set of sensors, sensor data that includes image data of a set of frames that depict one or more individuals that are outside of the vehicle. The one or more processors may identify, by analyzing the sensor data using one or more attribute recognition techniques, a set of attributes of an individual of the one or more individuals. The one or more processors may determine a set of scores indicating a set of likelihoods of a set of vehicle configurations being a preferred vehicle configuration for the individual. The determination may be based on the data model performing the machine-learning-driven analysis of at least one of: attribute data that identifies the set of attributes of the individual, or location data that identifies a location of the individual relative to the vehicle. The one or more processors may select a particular vehicle configuration, of the set of vehicle configurations, based on a score that indicates a likelihood of the particular vehicle configuration being the preferred vehicle configuration for the individual. The one or more processors may provide, to a vehicle component, an instruction to update a configurable value to cause the vehicle component to implement the particular vehicle configuration based on the updated configurable value.

According to some implementations, a non-transitory computer-readable medium may store instructions that include one or more instructions that, when executed by one or more processors of a vehicle, cause the one or more processors to receive sensor data that includes at least one of: image data of a set of frames that depict one or more individuals that are outside of the vehicle, body heat data that identifies body heat readings associated with the one or more individuals, or weather data that includes values that measure one or more types of weather in an area in which the vehicle is located. The one or more instructions may cause the one or more processors to identify, by analyzing the set of frames using a target recognition technique, one or more sets of pixels that are within the set of frames and that correspond to the one or more individuals, and identify, by analyzing the one or more sets of pixels using one or more attribute recognition techniques, a set of attributes of an individual of the one or more individuals. The one or more instructions may determine a set of scores indicating likelihoods of a set of vehicle configurations being a preferred vehicle configuration for the individual, based on a machine-learning-driven analysis of at least one of: attribute data that identifies the set of attributes of the individual, location data that identifies a location of the individual relative to the vehicle, the body heat data for the individual, or the weather data. The one or more instructions may select a particular vehicle configuration, of the set of vehicle configurations, based on a score that indicates a likelihood of the particular vehicle configuration being the preferred vehicle configuration for the individual. The one or more instructions may cause the one or more processors to provide, to a vehicle component, an instruction to update a configurable value to cause the vehicle component to implement the particular vehicle configuration by updating the configurable value.

DETAILED DESCRIPTION

Figure 1A:
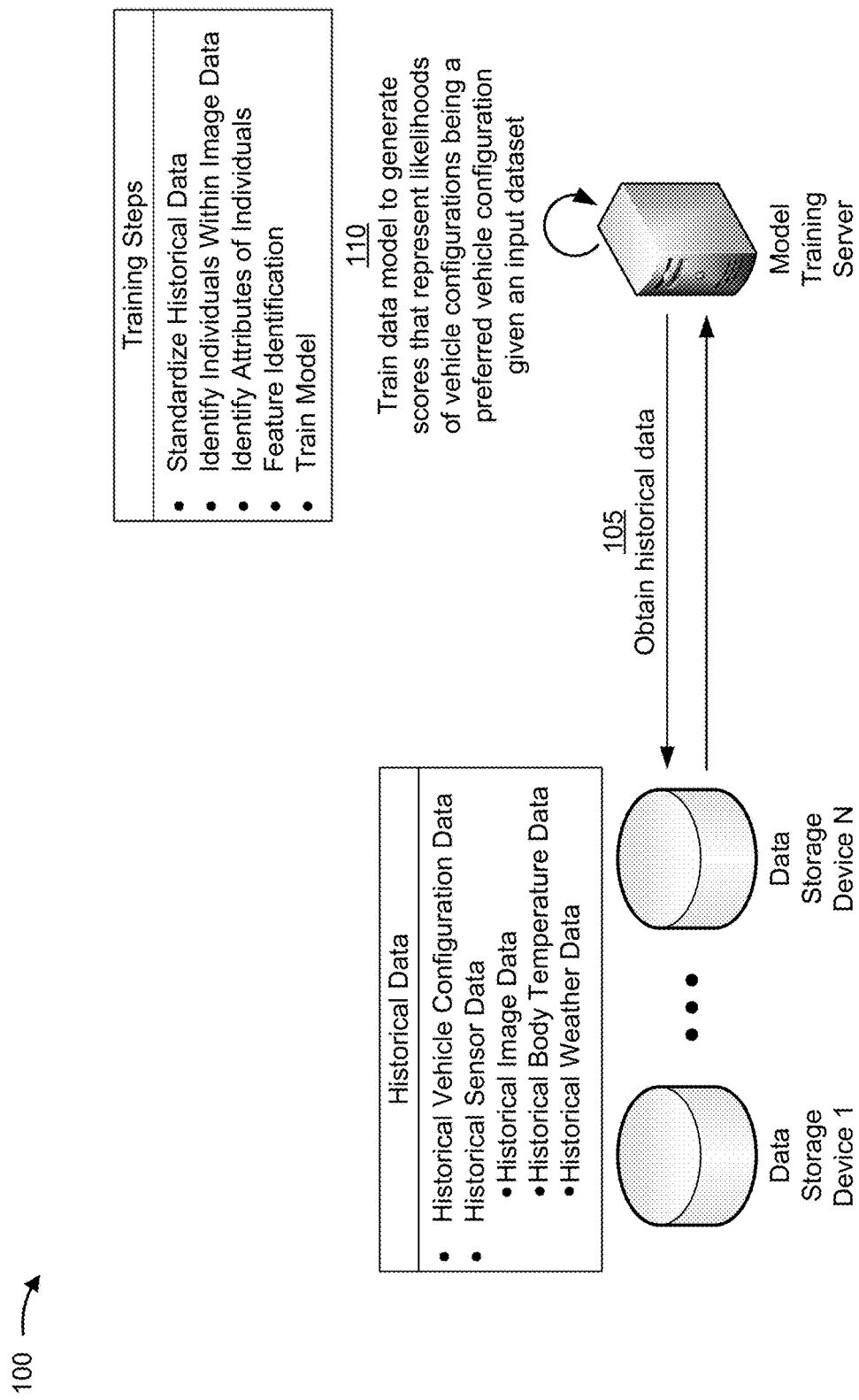
FIGS. 1A-1F are diagrams of one or more example implementations described herein.

The following detailed description of example implementations refers to the accompanying drawings. The same reference numbers in different drawings may identify the same or similar elements.

When an individual enters a vehicle, the individual may have to perform a series of tasks before the individual may begin driving. For example, the individual may have to open a vehicle door to sit in the vehicle, may have to change a seat configuration if a previous driver is a different size (e.g., height, weight, etc.), may have to change a configuration for one or more in-vehicle mirrors, may have to update a radio station to a preferred radio station, may have to adjust a temperature within the vehicle to a preferred temperature, and/or the like.

However, the individual often wastes considerable resources of the vehicle and puts unnecessary wear and tear on components of the vehicle by inefficiently performing these tasks. For example, to find a preferred seat positioning, the individual may first move the seat too far forward, only to subsequently adjust the seat too far backward. As another example, the individual may turn on heat within the vehicle, then may get too hot and subsequently turn on air conditioning. This wastes resources of the vehicle, wastes time of the individual, retracts from the individual's overall driving experience, and/or the like.

Some implementations described herein use one or more processors associated with a vehicle to identify when one or more individuals are approaching the vehicle, use machine learning to select a vehicle configuration for the one or more individuals, and cause one or more vehicle components to implement the vehicle configuration. For example, the vehicle may include a set of sensors that may capture image data that depicts one or more individuals that are outside of the vehicle. In this case, the vehicle (e.g., using the one or more processors) may analyze the image data to identify the one or more individuals and/or to identify attributes of the one or more individuals.

Additionally, the vehicle may determine scores for a set of vehicle configurations by performing a machine-learning-driven analysis of attribute data that identifies the attributes of the one or more individuals and/or location data that identifies a location of the one or more individuals relative to the vehicle. Furthermore, the vehicle may select a particular vehicle configuration based on the particular vehicle configuration corresponding to a score of the set of scores (e.g., a score associated with a highest likelihood of being a vehicle configuration preferred by an individual). In this case, the vehicle may provide instructions to one or more vehicle components to cause the one or more vehicle components to implement the particular vehicle configuration.

In this way, the vehicle implements the preferred vehicle configuration. This conserves processing resources of one or more vehicle components that would otherwise be expended to inefficiently perform in-vehicle tasks (e.g., an individual may needlessly waste resources by employing a trial and error method in trying to find a preferred vehicle configuration), conserves network resources used when vehicle components interact with each other to ineffectively modify vehicle configurations, and/or the like.

Furthermore, several different stages of the process described herein are automated, which improves speed and efficiency of the process and conserves computing resources (e.g., processor resources, memory resources, and/or the like). For example, by automatically implementing the particular vehicle configuration, the vehicle conserves computing resources relative to an inferior vehicle that would ineffectively use resources of the vehicle when subject to trial and error configuration modifications made by users. Additionally, implementations described herein use a rigorous, computerized process to perform tasks or roles that were not previously performed or were previously performed using subjective human intuition or input.

FIGS. 1A-1F are diagrams of one or more example implementations 100 described herein. Example implementation(s) 100 may include a set of data storage devices (shown as data storage device 1 through data storage device N), a model training server, and a vehicle that includes a set of sensors and a processing element.

As shown in FIG. 1A, and by reference number 105, the model training server may obtain, from the set of data storage devices, historical data that may be used to train a data model. For example, the model training server may obtain (or receive) historical vehicle configuration data, historical sensor data, and/or the like.

The historical vehicle configuration data may include, for a set of vehicles and for a group of individuals, door configurations, seat configurations, radio configurations, temperature configurations, trunk configurations, and/or the like. The historical sensor data may have been collected by sensors of the set of vehicles, and may include historical image data, historical body temperature data, historical weather data, and/or the like. The historical image data may depict individuals while the individuals are walking toward the vehicle. For example, as an individual walks toward a vehicle, image cameras of the vehicle may have captured images and/or video of the individual.

The historical body heat data may identify a body heat reading of an individual. For example, as an individual approaches a vehicle, thermal sensors may have obtained a body heat reading of the individual. The historical weather data may include values measuring one or more types of weather during time periods where the group of individuals were getting into the set of vehicles, driving the set of vehicles, and/or the like. For example, as an individual walks toward a vehicle, weather sensors may have obtained values that measure one or more types of weather for an area in which the vehicle is located.

As shown by reference number 110, the model training server may train a data model to generate scores that represent likelihoods of vehicle configurations being a preferred vehicle configuration given an input dataset. For example, the model training server may standardize the historical data to a uniform format, may identify individuals within the historical image data, may identify a set of attributes of the individuals within the historical image data, may identify a set of features that may be used to train the data model, and may train the data model, as each described below. As used herein, a preferred vehicle configuration may include a vehicle configuration that is predicted to be preferred by an individual, a vehicle configuration that is preferred by an individual (e.g., as may be indicated by user preferences data), a vehicle configuration that has a threshold likelihood of being preferred by an individual (e.g., based on being similar to previous configurations used by the individual, based on being compatible with attributes of the individual, and/or the like), and/or the like.

In some implementations, the model training server may standardize the historical data to a uniform format. For example, if some of the historical data is video data, the model training server may convert the video data to a set of frames that may be processed with the image data. Additionally, or alternatively, if the sensor data is in different file types or file formats, the model training server may standardize the sensor data into a uniform file type and/or file format.

Additionally, or alternatively, the model training server may eliminate one or more colors from the image data included in a frame. For example, the model training server may convert a first frame to a second frame that includes modified image data identifying a grayscale or a black and white depiction of an individual. In this case, the model training server may perform a color conversion technique to convert the image data (e.g., which may include pixels representing colors of a Red-Green-Blue (RGB) color scheme) to the modified image data (e.g., which may include pixels representing grayscale or black and white colors). Additionally, or alternatively, the model training server may reduce a number of pixels of the image data using a pixel reduction technique. By eliminating one or more colors from the image data and/or by reducing a number of pixels within the image data, the model training server conserves resources that would otherwise be wasted processing a higher quality image (e.g., which may not be needed for training the data model).

In some implementations, the model training server may identify an individual within an image. For example, the model training server may perform a target recognition technique to identify an individual within the image. The target recognition technique may include an object recognition technique, a histogram of oriented gradients (HOG) technique, a gait analysis technique, a gradient vectors technique, a cascading technique, an adaptive boosting technique, and/or a similar type of technique using computer vision.

As an example, the model training server may identify an individual within a frame using an object recognition technique. In this example, the model training server may compare clusters of pixels included in the image data to clusters of pixels that are stored using a data structure of images identifying individuals. The model training server may identify a set of pixels that depict the individual based on the set of pixels satisfying a threshold level of similarity with pixels included in the images that are stored via the data structure.

In some implementations, the model training server may identify a set of attributes of an individual. For example, the model training server may identify a set of attributes using one or more of the target recognition techniques described above. The set of attributes may include an attribute that identifies a size of the individual (e.g., a height, a weight, a body type, etc.), an attribute that identifies a gender of the individual, an attribute that identifies an age range of the individual, an attribute that identifies an emotion or expression made by the individual, and/or the like.

As an example, the model training server may identify a set of attributes of an individual within a frame using a HOG technique. In this example, the model training server may use the HOG technique to identify one or more sets of pixels that represent attributes of an individual. For example, the model training server may use the HOG technique to identify a first set of pixels that represent a nose of an individual, a second set of pixels that represent eyes of the individual, a third set of pixels that represent a mouth of individual, and/or any other sets of pixels that may identify particular facial attributes of the individual. In this case, while performing the HOG technique, the model training server may identify each respective set of pixels using an image gradient that identifies edges of particular facial attributes based on intensity or color of pixels in the image. Additionally, the model training server may represent the one or more sets of pixels using a matrix of vectors. Furthermore, the model training server may determine that the individual identified in the frame is a known individual (e.g., an individual registered to the vehicle) by comparing the matrix of vectors to a stored matrix of vectors for the individual.

As another example, the model training server may identify a set of attributes of an individual within a frame using a gait analysis technique. In this example, the model training server may analyze the image data using a gait analysis technique. Additionally, the model training server may identify one or more gait attributes for the individual based on analyzing the image data with the gait analysis technique. The one or more gait attributes may include an attribute that indicates a height, an attribute that indicates a gender, an attribute that indicates an age range, an attribute that indicates a body type, and/or the like. Furthermore, the model training server may determine that the individual is a registered user based on an analysis of the one or more gait attributes. For example, the individual may have submitted a form of identification or a picture of the individual and the model training server may determine that the individual is a registered user by comparing the one or more gait attributes and attributes that can be identified from the identification or the picture of the individual. By identifying that the individual is a registered user, the data model may be trained on user preferences data for the individual, thereby further improving accuracy of the predictions.

In some implementations, the model training server may identify a set of features that may be used to train the data model. For example, the model training server may identify a set of features that include a subset of features that serve as indicators of a preferred vehicle configuration (e. g., a user preference, a repeated action performed by an individual over time, such as listening to a particular radio station, changing an in-vehicle temperature to the same temperature, repeatedly placing a briefly into a particular location within the vehicle, and/or the like), a subset of features that serve as indicators that a vehicle configuration is not a preferred vehicle configuration and/or is an unwanted vehicle configuration by an individual, a subset of features that may be used as indicators of an individual being a registered user (e.g., which may have identifiable user preferences that may be used when training the data model), a subset of features that serve as indicators of a group of pixels being a particular attribute of an individual, a subset of features that may be used as indicators of a particular type of weather, a subset of features that may be used as indicators of an individual approaching the vehicle with one or more additional objects (e.g., a suitcase, an umbrella, etc.), and/or the like. In this case, the model training server may use a feature identification technique to analyze the image data, the pixels of the individual, the pixels representing the attributes of the individual, and/or the like, to identify the set of features. The set of features may include a specific vehicle configuration value, a combination of vehicle configuration values, a user preferences value, a combination of user preferences values, a pixel or group of pixels of an image (e.g., that identify, one or more attributes of an individual), a vector or set of vectors (as described below), a sensor data value, a combination of sensor data values, a combination of one or more of the features mentioned above, and/or the like.

In some implementations, the model training server may train the data model. For example, the model training server may train the data model to use one or more machine learning techniques to analyze the historical data, the set of features, the set of vectors, and/or the like, such that the data model is able to receive an input dataset and may process the input dataset to generate a set of scores for a set of vehicle configurations. The set of scores may indicate likelihoods of the set of vehicle configurations being a preferred vehicle configuration. The one or more machine learning techniques may include a classification technique, a regression technique, a neural network (e.g., a convolutional neural network (CNN)), and/or the like.

In some implementations, the model training server may train a data model using a CNN. In this case, the model training server may analyze a set of vectors (that represent the historical data values) using a set of convolutional layers of a CNN, a set of pooling layers of the CNN, a fully-connected layer of the CNN, a results layer of the CNN, and/or the like. For example, the model training server may analyze the set of vectors using a first convolutional layer of the CNN by applying a filter to one or more portions of the set of vectors. The filter may be an array of numbers that represent weighted values. As the filter is applied to the set of vectors (the filter may be described as convolving around different portions of the image, or as being applied to different vectors that represent the different portions of the image), the filter may be used to multiply the one or more weighted values of the filter with the matrix of values that represent the set of vectors. The output of applying the filter to the one or more portions of the set of vectors may be a feature map. The feature map may be a matrix of values that represents, for the set of features used to train the CNN, a likelihood of certain parts of the image data (i.e., certain portions of the set of vectors) being particular features.

Continuing with the example, the model training server may provide the feature map generated from the first convolutional layer of the CNN as an input to a first pooling layer or to a second convolutional layer of the CNN. If the first convolutional layer identified high-level features such as a particular line within the image, or a group of lines within the image, the second convolutional layer may be used to generate a feature map with more complex features, such as semi-circles, squares, or other shapes. Each additional convolutional layer may be used to identify more complex features.

Continuing with the example, the model training server may provide an output of a final convolutional layer (e.g., a final feature map) as input to a fully connected layer to output an N-dimensional vector where N is a number of classes that are capable of being selected. As a particular example, if there are ten different scores for a vehicle configuration, the output might be an array of ten values, where each value in the array represents a likelihood of a particular score.

In some implementations, as described above, the model training server may train a data model that is able to identify one or more attributes of an individual, identify that an individual is a registered user, to identify a preferred vehicle configuration for the individual (e.g., based on identifying the one or more attributes, that the individual is a registered user, a weather reading, and/or the like), and/or the like. In some implementations, the model training server may train multiple data models. For example, the model training server may train a first data model to identify attributes of an individual, may train a second data model to identify that the individual is a registered user, may train a third data model to identify a preferred vehicle configuration for the individual, and/or the like.

As a specific example, the model training server may train a computer vision model for identifying attributes of an individual and may train a predictive model for identifying that the individual is a registered user. As another example, the model training server may train a computer vision model using facial recognition and/or image recognition to identify that the individual is a registered user. In this example, the model training server would have to train the computer vision model using image data of the individual (e.g., when the individual registers to use the vehicle configuration service, the individual may have to provide a photograph that may be used for training the computer vision model).

In this way, the model training server trains a data model that may be used to score vehicle configurations.

Figure 1B:
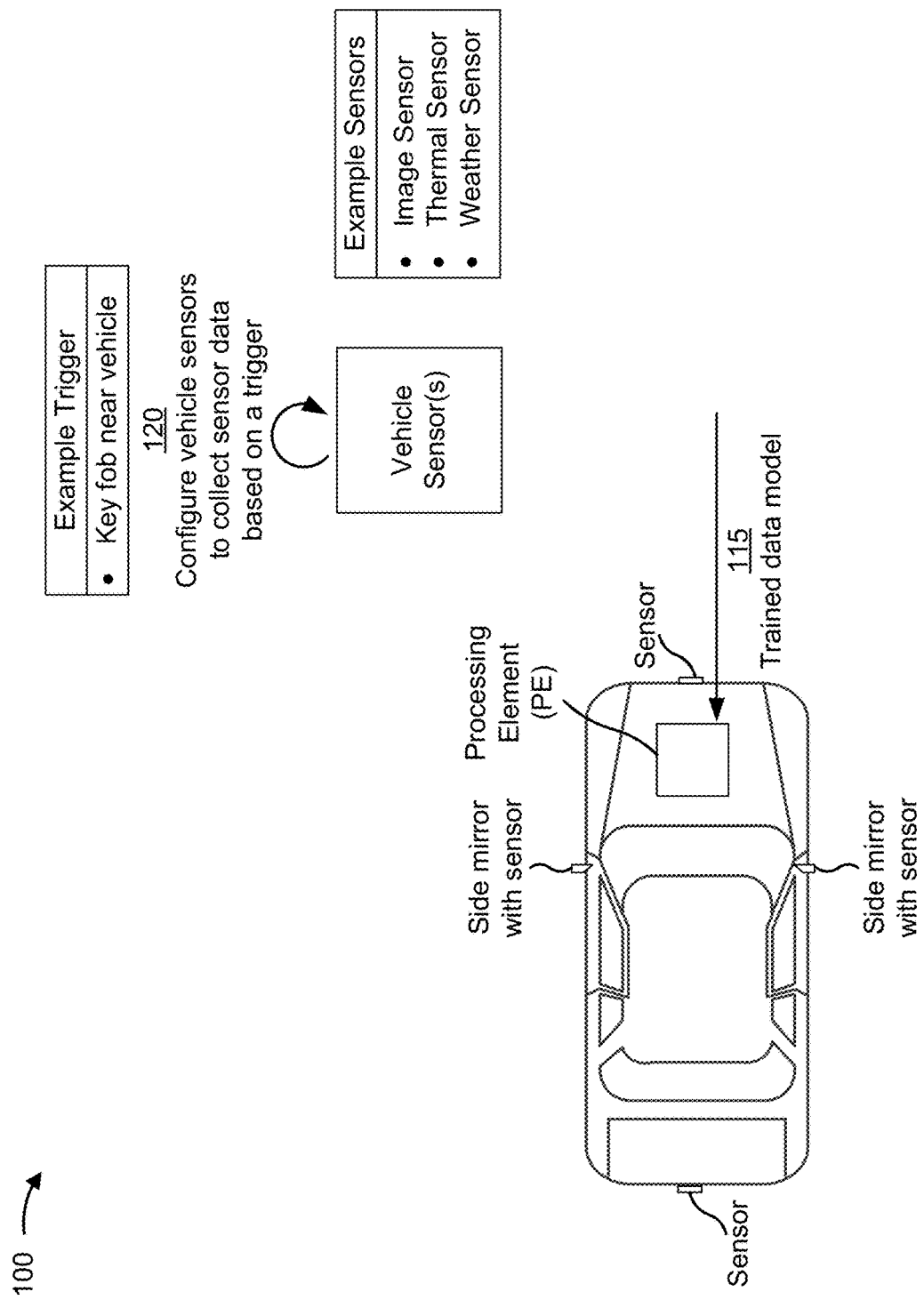

As shown in FIG. 1B, and by reference number 115, the vehicle may receive the trained data model. For example, the model training server may provide the trained data model to the processing element of the vehicle using a communication interface, such as an application programming interface (API) or a similar type of interface. The processing element of the vehicle may include one or more processors, such as a microcontroller, a digital signal processor (DSP), a dedicated processor used for generating vehicle configurations, and/or the like. In some implementations, the data model may be trained locally by the vehicle (rather than by the model training server).

As shown by reference number 120, the set of sensors of the vehicle may be configured to collect sensor data based on a trigger. For example, the set of sensors may be configured to power on and to collect sensor data based on a trigger.

The set of sensors may include one or more image sensors, one or more thermal sensors, one or more weather sensors, and/or the like. For example, the one or more image sensors may be cameras that are installed at various places on the vehicle. As an example, the one or more cameras may include a side camera that can capture images of a blind spot (e.g., a side camera on a driver side of the vehicle, a side camera on a front passenger side of the vehicle, etc.), a front side or rear side camera that can assist in vehicle parking, and/or the like. The one or more image sensors may capture image data that depicts one or more individuals that are outside of the vehicle.

In some implementations, the one or more thermal sensors may be used to detect body heat of individuals that are approaching the vehicle. For example, a thermal sensor may detect a body heat reading of an individual that is approaching the vehicle. In some implementations, the one or more weather sensors may be used to determine values used to measure one or more types of weather in an area around the vehicle.

In some implementations, a sensor may be configured to collect sensor data based on a key fob being within a threshold proximity of the vehicle. For example, when a key fob is within a threshold proximity of the vehicle, the key fob may be configured to send an encoded signal to the vehicle. When the vehicle receives the encoded signal, the vehicle may power on the sensor to allow the sensor to start collecting sensor data. Additionally, or alternatively, a sensor may be configured to collect sensor data based on a key fob unlocking one or more vehicle doors or automatically starting the vehicle, in a similar manner to that described above.

In this way, the processing element of the vehicle is configured with the data model and the set of sensors of the vehicle are configured to collect sensor data may be processed by the data model.

Figure 1C:
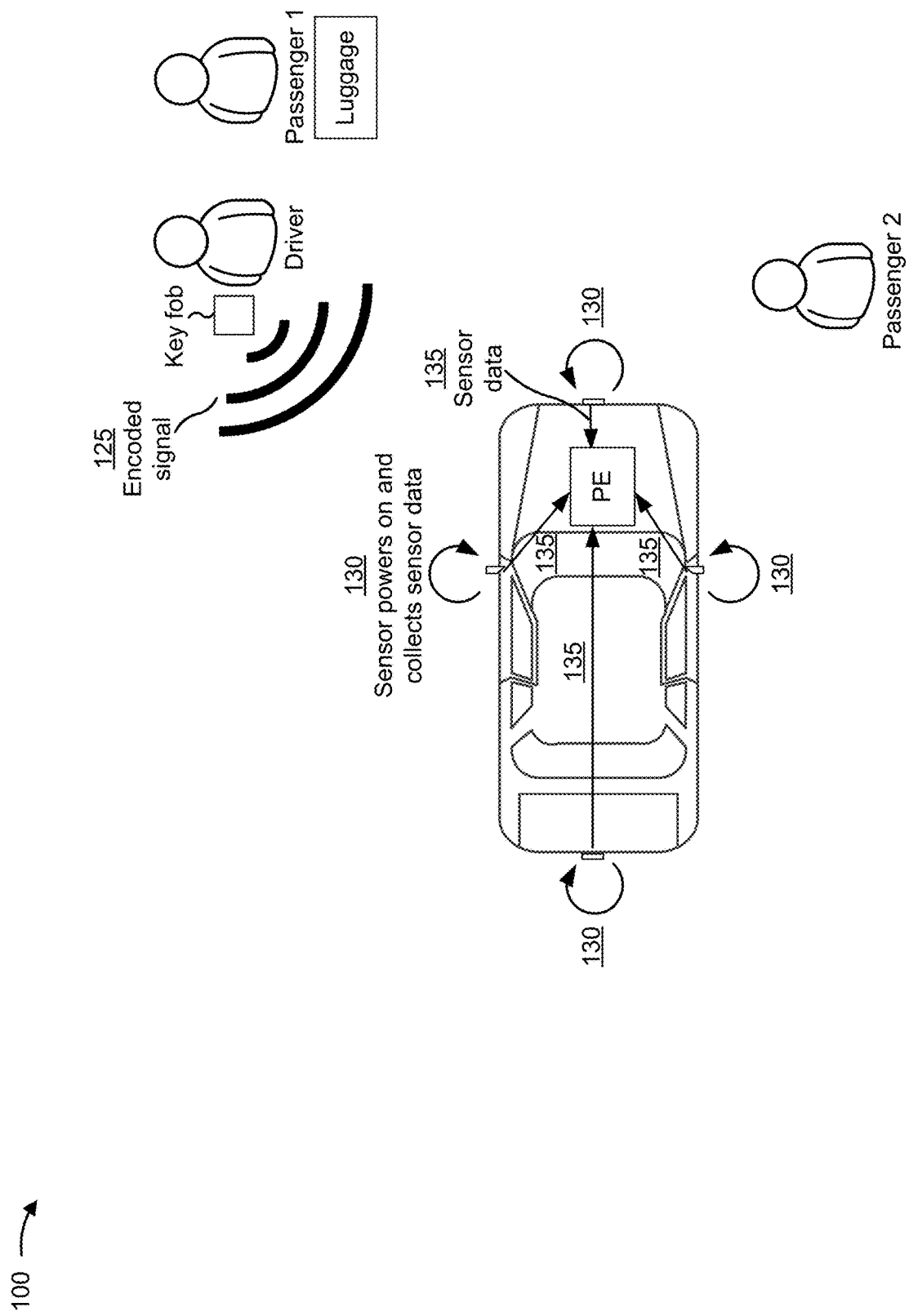

As shown in FIG. 1C, and by reference number 125, a driver carrying a key fob may walk within the threshold proximity of the vehicle. For example, a driver and two passengers may approach the vehicle while the driver is carrying the key fob. In this case, when the key fob comes within the threshold proximity of the vehicle, the key fob may use radio waves to send an encoded signal to the vehicle. The encoded signal may, for example, include instructions to activate the set of sensors of the vehicle.

As shown by reference number 130, the set of sensors may power on and collect sensor data. For example, the processing element may receive the encoded signal from the key fob and may, based on receiving the encoded signal, provide instructions to the set of sensors to power on and begin capturing sensor data.

In some implementations, a sensor may power on. For example, a sensor may power on by initiating a boot-up procedure that may be triggered by the processing element of the vehicle.

In some implementations, a sensor may capture sensor data. For example, an image sensor may capture image data that depicts one or more individuals that are outside of the vehicle. In the example shown, a first image sensor may capture image data of the driver and the first passenger and a second image sensor may capture image data of the second passenger. The image data may include a set of images, a set of frames of a video, and/or the like.

As another example, a thermal sensor may capture body heat data that identifies body heat readings associated with the one or more individuals. In the example shown, a first thermal sensor may capture body heat data for the driver and the first passenger and a second thermal sensor may capture body heat data for the second passenger.

As another example, a weather sensor may capture values that measure one or more types of weather for an area in which the vehicle is located. As a specific example, a weather sensor may capture values that indicate a temperature of the air, an amount of precipitation, an amount of snow, and/or the like.

As shown by reference number 135, the set of sensors may provide the sensor data to the processing element of the vehicle. For example, the set of sensors may provide the sensor data to the processing element of the vehicle using a communication interface, such as an API or a similar type of interface.

In this way, the processing unit of the vehicle receives sensor data that has been collected from the set of sensors.

Figure 1D:
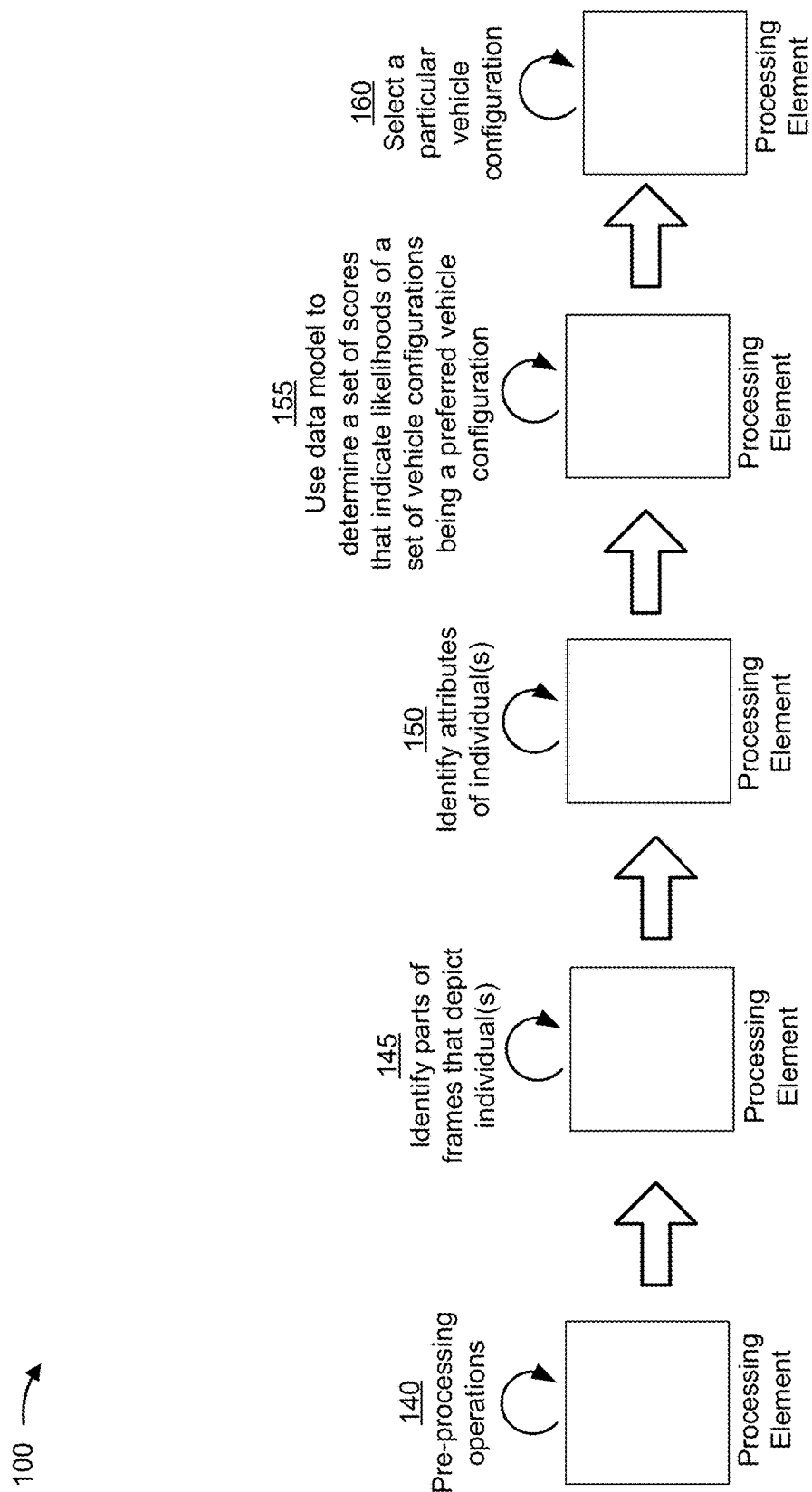

As shown in FIG. 1D, and by reference number 140, the vehicle (e.g., using the processing element) may perform one or more pre-processing operations on the sensor data. For example, the vehicle may standardize the sensor data, may eliminate one or more colors from the sensor data, may reduce a number of pixels of the image data, and/or the like, in a manner described elsewhere herein.

As shown by reference number 145, the vehicle (e.g., using the processing element) may identify one or more sets of pixels that depict the one or more individuals. For example, the vehicle may identify an individual using a target recognition, in a manner described elsewhere herein. As shown by reference number 150, the vehicle (e.g., using the processing element) may identify a set of attributes for the one or more individuals. For example, the vehicle may identify a set of attributes of an individual using a target recognition technique, in a manner described elsewhere herein.

In some implementations, the vehicle (e.g., using the processing element) may cause data that identifies attributes of an individual to be stored in memory. For example, the vehicle may cause data that identifies the attributes of an individual to be stored in association with an identifier of the individual and/or in association with data that identifies a preferred vehicle configuration. By storing the attributes of the individual in association with the identifier of the individual and/or the data that identifies the preferred vehicle configuration, the vehicle is able to determine a preferred vehicle configuration without needing to first identify certain attributes in real-time. For example, rather than having to identify a height of a user approaching the vehicle (e.g., which may be used to determine an appropriate distance in which to adjust a seat of the vehicle), the vehicle may simply need to identify a sufficient number of attributes needed to verify that the individual is a registered individual. This may allow the vehicle to reference a data structure used to store the attributes of the individual and/or the preferred vehicle configuration.

As shown by reference number 155, the vehicle (e.g., using the processing element) may use the data model to determine a set of scores that indicate likelihoods of a set of vehicle configurations being a preferred vehicle configuration. For example, the vehicle may identify data to include with an input dataset that is to be provided to the data model and may provide the input dataset as input to the data model to determine the set of scores. In this case, the vehicle may first determine location data for the one or more individuals in relation to the vehicle. For example, if a first sensor in a first position of the vehicle captures an image of a first individual, the vehicle will know that the first individual has a particular location relative to the vehicle. Furthermore, if the vehicle identified any of the one or more individuals as registered users, the vehicle may obtain user preferences data for the registered user and may include the user preferences data as part of the input dataset to the data model.

Additionally, the vehicle may provide the data model with an input dataset that includes the attribute data, the location data, the body heat data, the weather data, and/or the user preferences data for one or more of the individuals that were identified as registered users. In this case, the data model may process the input dataset to output a set of scores that indicate likelihoods of the set of vehicle configurations being the preferred vehicle configuration.

As shown by reference number 160, the vehicle (e.g., using the processing element) may select a particular vehicle configuration. For example, the vehicle may select a particular vehicle configuration based on a score, of the set of scores, that represents a highest likelihood of being the preferred vehicle configuration (relative to the other scores in the set of scores). Examples of the particular vehicle configuration are provided further herein.

In some implementations, the vehicle may select a vehicle configuration based on the data model identifying that an individual is a registered user. For example, the data model may have identified with a threshold confidence level that the individual is a registered user. If the registered user has configured user preferences, the vehicle may select the vehicle configuration that aligns with those user preferences.

Additionally, or alternatively, the vehicle may select a vehicle configuration based on the data model identifying one or more attributes of individuals. For example, if the data model is unable to identify a registered user, the data model may be able to identify, with a threshold confidence level, that the individual approaching possesses certain attributes. In this case, the vehicle may select a vehicle configuration that is predicted (e.g., by the data model) to be preferred by individuals that possess the identified attributes. In this way, one or more implementations described herein may be applied to vehicles other than personal vehicles, such as vehicles used as part of ride sharing services, taxis, and/or the like.

In some implementations, the vehicle may continuously monitor particular attributes while the individual is within the vehicle and may update user preferences data for the individual based on the monitored particular attributes. For example, the vehicle may, while the individual is driving, identify particular attributes of the vehicle and/or the individual and may retrain the data model based on the particular attributes. The data model may be retrained such that particular scores may be adjusted to reflect changes in user preferences over time.

In this way, the vehicle is able to use machine learning to select a particular vehicle configuration that is predicted to be a preferred vehicle configuration given the input dataset.

Figure 1E:
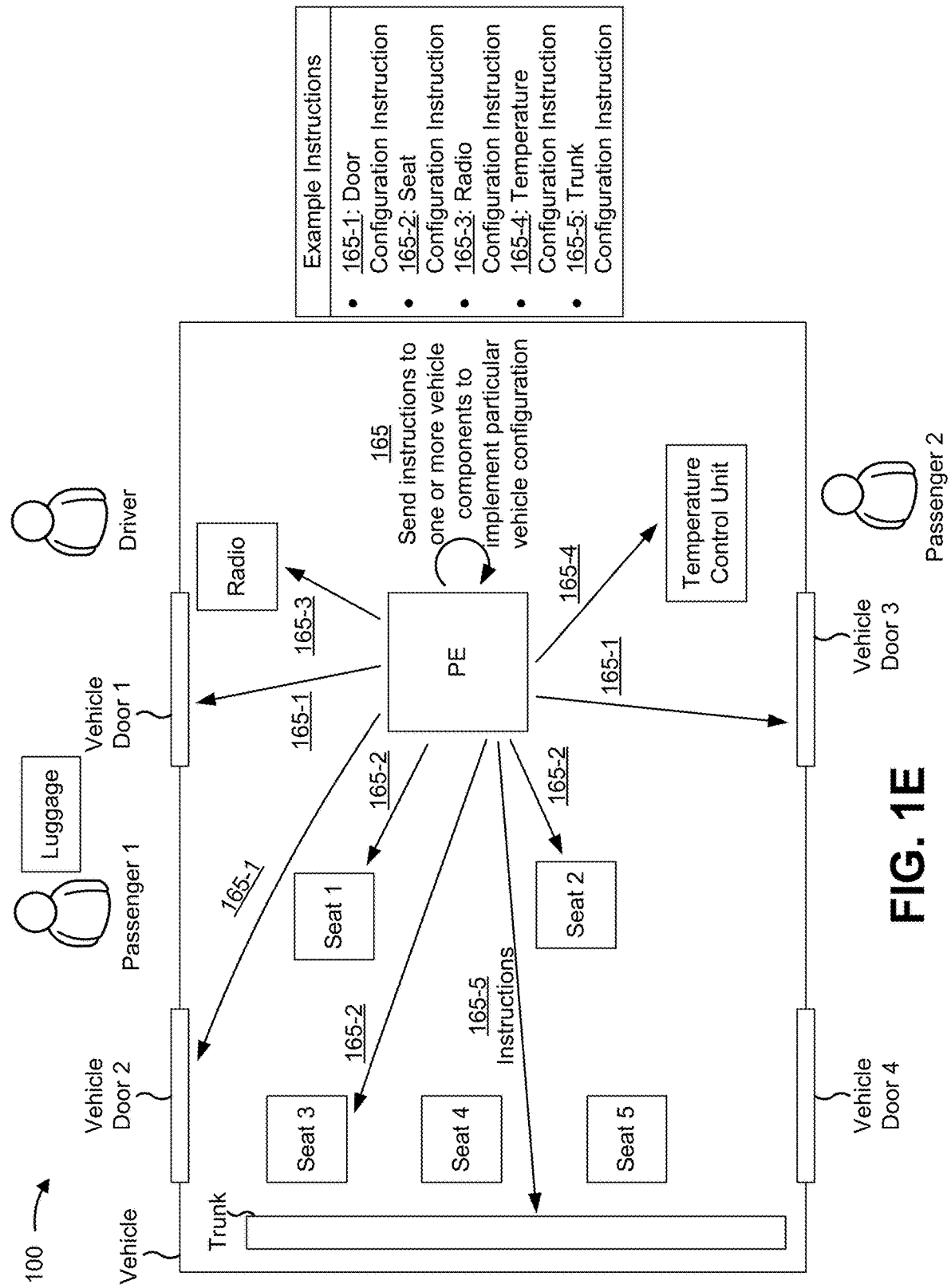

As shown in FIG. 1E, and by reference number 165, the vehicle (e.g., using the processing element) may send instructions to one or more vehicle components to implement the particular vehicle configuration. The one or more vehicle components may include one or more vehicle doors, one or more vehicle seats, a trunk of the vehicle, a radio of the vehicle, a temperature control unit of the vehicle, and/or the like. The example illustrates that the particular vehicle configuration may include one or more of the instructions described in connection with reference number 165-1, 165-2, 165-3, 165-4, and 165-5. In practice, the particular vehicle configuration may include more instructions, modified versions of the same instructions, fewer instructions, instructions to other vehicle components not described herein, and/or the like.

As shown by reference number 165-1, the vehicle may send, to one or more vehicle doors (e.g., to a control associated with the one or more vehicle doors), a door configuration instruction that indicates to open a vehicle door. For example, the vehicle may send a door configuration instruction to a door based on the data model predicting that an individual is to enter the vehicle through the door. In the example shown, the vehicle may provide a door configuration instruction to a first vehicle door (e.g., based on the data model predicting that the driver will enter the vehicle through the first vehicle door), to a second vehicle door (e.g., based on the data model predicting that the first passenger will enter the vehicle through the first vehicle door), and to a third vehicle door (e.g., based on the data model predicting that the second passenger will enter the vehicle through the first vehicle door).

In some implementations, an individual might be approaching a vehicle door and the particular vehicle configuration may not automatically open the door. For example, a parent may have a user preference to implement child safety locks such that a child may be able to enter the vehicle only by way of a parent manually opening the door for the child. This functionality may be driven by the processing element being able to identify an approaching individual as a registered user, by the processing element being able to identify an individual as being below a threshold height (e.g., which may increase a likelihood of that individual being a child), and/or the like.

Additionally, or alternatively, and as shown by reference number 165-2, the vehicle (e.g., using the processing element) may send, to one or more vehicle seats, a seat configuration instruction that indicates to implement a particular seat configuration. For example, the vehicle may send a seat configuration instruction that is based on the vehicle having identified a height of an individual that is predicted to sit in the seat, a width of the individual that is predicted to sit in the seat, that the individual is a registered user that has user preferences data identifying a specific seat configuration, and/or the like. The particular seat configuration may modify a first directional positioning of the seat (e.g., a side-to-side positioning), a second directional positioning of the seat (e.g., an up-and-down positioning), a temperature of the seat (e.g., if the seat has a heated seat feature), and/or the like.

In the example shown, the vehicle may provide a seat configuration instruction to a first seat of the vehicle (e.g., based on the data model predicting that the driver will sit on the first seat), to a second seat of the vehicle (e.g., based on the data model predicting that the second passenger will sit on the second seat), and to a third seat of the vehicle (based on the data model predicting that the first passenger will sit on the third seat). As described above, the positioning of the seats may have been selected based on the heights of the one or more individuals, the widths of the one or more individuals, the user preferences of the one or more individuals, a direction by which the one or more individuals are approaching the vehicle, and/or the like.

As shown by reference number 165-3, the vehicle may send, to a radio of the vehicle, a radio configuration instruction that indicates to set a configuration of a radio of the vehicle. For example, the vehicle may send a radio configuration instruction to the radio based on the vehicle being able to identify one of the individuals as a registered user which allowed the data model to generate the set of scores based on user preferences data for the registered user (e.g., which might indicate a preferred radio station, a radio station that the registered user listens to mostly frequency, a radio station that the registered user most recently had playing, and/or the like).

As shown by reference number 165-4, the vehicle (e.g., using the processing element) may send, to a temperature control unit of the vehicle, a temperature configuration instruction that indicates to set a temperature for an interior of the vehicle. For example, the vehicle may send a temperature configuration instruction based on a values that measure one or more types of weather that are obtained by the weather sensor, based on a body heat reading associated with an individual (e.g., as obtained by the thermal sensor), based on identifying that an individual is a registered user and considering user preferences data of the registered user when determining the particular vehicle configuration (e.g., the registered user may prefer a particular in-vehicle temperature), and/or the like.

As shown by reference number 165-5, the vehicle (e.g., using the processing element) may send, to a trunk of the vehicle (e.g., to a controller associated with the trunk), a trunk configuration instruction that indicates to open a trunk of the vehicle. For example, the vehicle may send a trunk configuration instruction to the trunk based on the vehicle identifying that one of the individuals was carrying luggage when approaching the vehicle, based on identifying that an individual is a registered user and having access to calendar information (e.g., a flight schedule) of the registered user, and/or the like.

In this way, the vehicle provides the one or more vehicle components with instructions to implement the particular vehicle configuration.

Figure 1F:
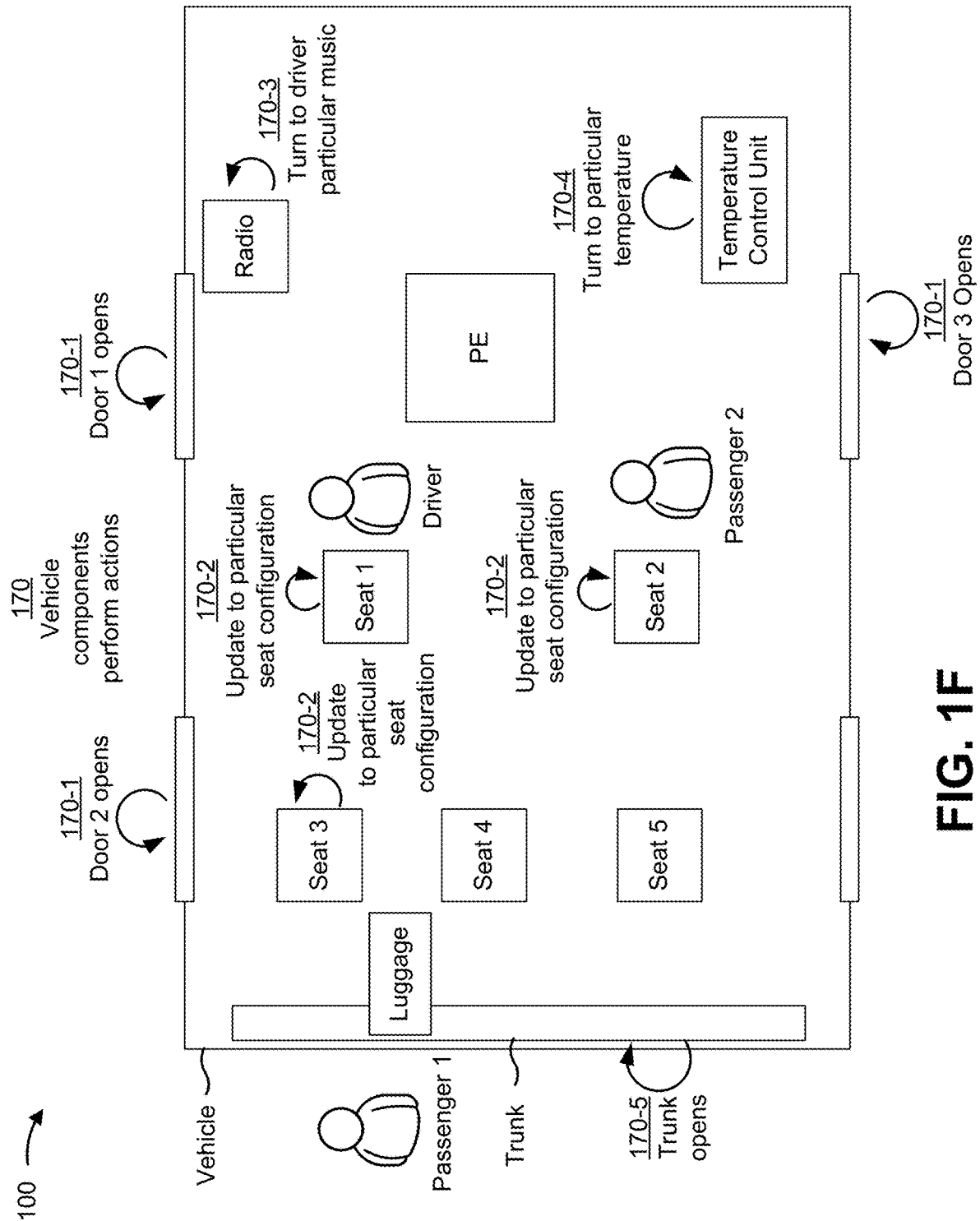

As shown in FIG. 1F, and by reference number 170, the one or more vehicle components may perform actions to implement the particular vehicle configuration. As shown by reference number 170-1, the vehicle (e.g., using a vehicle doors control mechanism) may open the one or more vehicle doors. In the example shown, the first door, the second door, and the third door, may be opened based on each receiving the door configuration instruction.

In this way, the one or more individuals do not have to manually open the vehicle doors, thereby improving customer satisfaction, reducing wear and tear on the vehicle doors (relative to individuals manually opening and closing doors using unnecessary amounts of force), and/or the like. Furthermore, preventing doors from opening when a child is present or when a vehicle restriction is indicated in user preferences will improve overall vehicle safety by reducing situations where a child may be put into an at-risk position by entering the vehicle without permission of a parent or guardian.

As shown by reference number 170-2, the vehicle (e.g., using a vehicle seats control mechanism) may implement one or more seat configurations for seats within the vehicle. For example, the vehicle may modify a positioning of one or more seats within the vehicle, may update a seat temperature for one or more seats within the vehicle, and/or the like. In the example shown, the vehicle may modify a seat configuration for the first seat, the second seat, and the third seat, based on the vehicle seats control mechanism receiving the seat configuration instruction. In this way, the vehicle ensures that each individual has a preferred seat configuration upon entering the vehicle. This improves customer satisfaction, reduces wear and tear on the buttons or knobs of the seat that would otherwise be used to manually alter a seat configuration, and/or the like. Furthermore, processing resources of the vehicle seat control mechanism is conserved by providing individuals with optimal seat configurations on a first attempt (whereas an individually might manually play with the seat configurations, extend the seat too far, then retract the seat too far in the opposite direction, etc.).

As shown by reference number 170-3, the vehicle (e.g., using the radio or a radio control mechanism) may implement the configuration of the radio by setting the radio to a particular radio station. For example, the vehicle may update the radio to a radio station that is a favorite radio station of an individual, to a radio that an individual most recently had on, and/or the like. In some implementations, the configuration of the radio may identify a genre of music, a set of songs, and/or the like. In this case, the vehicle may search a set of radio stations to identify a station that is playing the genre of music, the set of songs, and/or the like. In this way, the vehicle improves customer satisfaction, conserves radio resources that would otherwise be expended by an individual manually changing between radio stations to find a preferred radio station, and/or the like.

As shown by reference number 170-4, the vehicle (e.g., using the temperature control unit) may implement the temperature configuration instruction by updating a temperature of the vehicle to a particular temperature. For example, the vehicle may update the temperature using the temperature control unit of the dashboard (e.g., by turning on cold air, by turning on hot air, etc.). As indicated above, the temperature may be updated based on weather, body heat of an individual, user preferences, and/or the like. In this way, the vehicle improves customer satisfaction, improves driving conditions by providing the driver a comfortable in-vehicle environment, conserves resources of the temperature control unit relative to having an individually manually change back and forth between various temperatures, and/or the like.

As shown by reference number 170-5, the vehicle (e.g., using a trunk control mechanism) may implement the trunk configuration instruction by opening the trunk. For example, the vehicle may use the trunk control mechanism to open the trunk based on receiving the trunk configuration instruction. In the example shown, the first passenger may have brought luggage and may put the luggage into the trunk of the vehicle. This improves customer satisfaction, reduces wear and tear on the trunk of the vehicle (relative to individuals manually exerting an unnecessary amount of force to open and close the trunk), and/or the like.

In this way, the vehicle identifies and implements the preferred vehicle configuration. This conserves processing resources of one or more vehicle components that would otherwise be expended to inefficiently perform in-vehicle tasks (e.g., an individual may needlessly waste resources by employing a trial and error method in trying to find a preferred vehicle configuration), conserves network resources used when vehicle components interact with each other to ineffectively modify vehicle configurations, and/or the like.

As indicated above, FIGS. 1A-1F are provided merely as an example. Other examples may differ from what was described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple and/or distributed devices. Additionally, or alternatively, a set of devices (e.g., one or more devices) of example implementation(s) 100 may perform one or more functions described as being performed by another set of devices of example implementation(s) 100.

Figure 2:
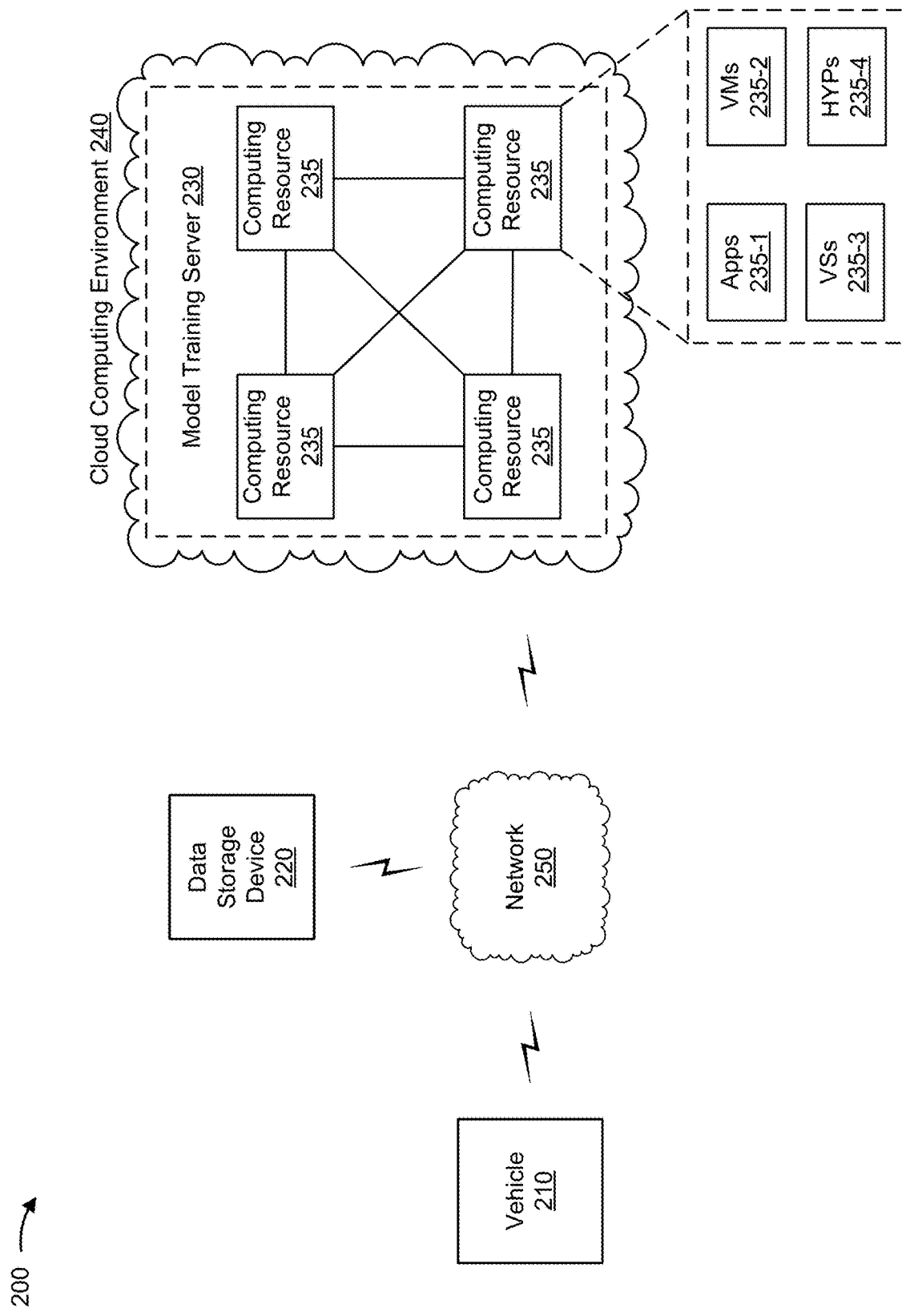
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a vehicle 210, a data storage device 220, a model training server 230 hosted within a cloud computing environment 240, and/or a network 250. Devices of environment 200 may interconnect via wired connections, wireless connections, or a combination of wired and wireless connections.

Vehicle 210 includes one or more vehicles capable of driving to a particular destination. For example, vehicle 210 may include a car, a truck, a boat, a plane, a ship, a drone, an autonomous vehicle, and/or a similar type of vehicle. In some implementations, vehicle 210 may include a set of vehicle components, such as a set of vehicle doors, a set of vehicle seats, a radio, a temperature control unit, a set of vehicle mirrors, and/or the like.

In some implementations, vehicle 210 may include one or more communication systems capable of supporting a processing element. For example, vehicle 210 may support a controller area network (CAN) bus, a personal area network (PAN), and/or any other communication systems and/or protocols that allow microcontrollers and applications within vehicle 210 to interact with each other (e.g., such as microcontrollers and applications associated with the processing element). In some implementations, the processing element may be a secure processing element that is protected by one or more forms of encryption. In some implementations, the processing element may include a secure memory or may have access to a secure memory. In some implementations, vehicle 210 may communicate with an access device. For example, a vehicle component and/or the processing element of vehicle 210 may communicate with an access device, such as a key fob, a smart card (e.g., a dynamic smart card) that is programmed for accessing vehicle 210, and/or the like.

In some implementations, vehicle 210 may include a set of sensors. For example, vehicle 210 may include an image sensor (e.g., a visual spectrum imaging camera, an infrared or near infrared imaging camera, etc.), a thermal sensor (e.g., a thermal imaging camera, etc.), a weather sensor (e.g., a thermometer, a barometer, a hygrometer, an anemometer, etc.), and/or the like. In some implementations, one or more sensors may be powered on based on the access device. For example, one or more sensors may be powered on based on the access device being within a threshold distance of vehicle 210. Additionally, or alternatively, one or more sensors may remain in a powered on state at all times (e.g., in a low-energy state, and/or the like), may be powered on based on a trigger other than the access device, and/or the like. For example, a sensor may remain in a low-energy state and may detect motion near vehicle 210. When the sensor detects motion, the state of the sensor may change from the low-energy state to a state that allows the sensor to generate sensor data, to a state that allows the sensor to power on and/or modify a state of one or more other sensors, and/or the like.

In some implementations, vehicle 210 may receive a trained data model. For example, the processing element may receive the trained data model. In some implementations, a set of sensors of vehicle 210 may be configured to collect sensor data based on a trigger. In some implementations, vehicle 210 may power on the set of sensors (e.g., based on receiving an encoded signal) and the set of sensors may collect sensors data. In some implementations, the set of sensors may provide the sensor data to the processing element of vehicle 210. In some implementations vehicle 210 may use the trained data model to perform one or more actions described herein as being performed by the processing element.

Data storage device 220 includes one or more devices capable of receiving, storing, generating, determining, and/or providing historical data. For example, data storage device 220 can include a server device or a group of server devices. In some implementations, data storage device 220 may store provide historical data to vehicle 210 and/or model training server 230.

Model training server 230 includes one or more devices capable of receiving, storing, generating, determining, and/or providing information associated with training a data model. For example, model training server 230 may include a server device (e.g., a host server, a web server, an application server, etc.), a data center device, or a similar device. In some implementations, model training server 230 may obtain, from data storage device 220, historical data that may be used to train a data model. In some implementations, model training server 230 may train a data model as described elsewhere herein. In some implementations, model training server 230 may provide the trained data model to vehicle 210.

In some implementations, as shown, model training server 230 may be hosted in cloud computing environment 240. Notably, while implementations described herein describe model training server 230 as being hosted in cloud computing environment 240, in some implementations, model training server 230 might not be cloud-based (i.e., may be implemented outside of a cloud computing environment) or may be partially cloud-based.

Cloud computing environment 240 includes an environment that hosts model training server 230. Cloud computing environment 240 may provide computation, software, data access, storage, etc., services that do not require end-user knowledge of a physical location and configuration of system(s) and/or device(s) that hosts model training server 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host model training server 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by vehicle 210 and/or data storage device 220. Application 235-1 may eliminate a need to install and execute the software applications on these devices. For example, application 235-1 may include software associated with model training server 230 and/or any other software capable of being provided via cloud computing environment 240. In some implementations, one application 235-1 may send/receive information to/from one or more other applications 235-1, via virtual machine 235-2. In some implementations, application 235-1 may be a mobile application or a web application that allows vehicle 210 to display a list of one or more applications with which an individual has an account, a recommendation to change login information to an application that has been compromised by a data breach, a message indicating that the login information to the application has been changed automatically, and/or the like.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., vehicle 210, data storage device 220, etc.), and may manage infrastructure of cloud computing environment 240, such as data management, synchronization, and/or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
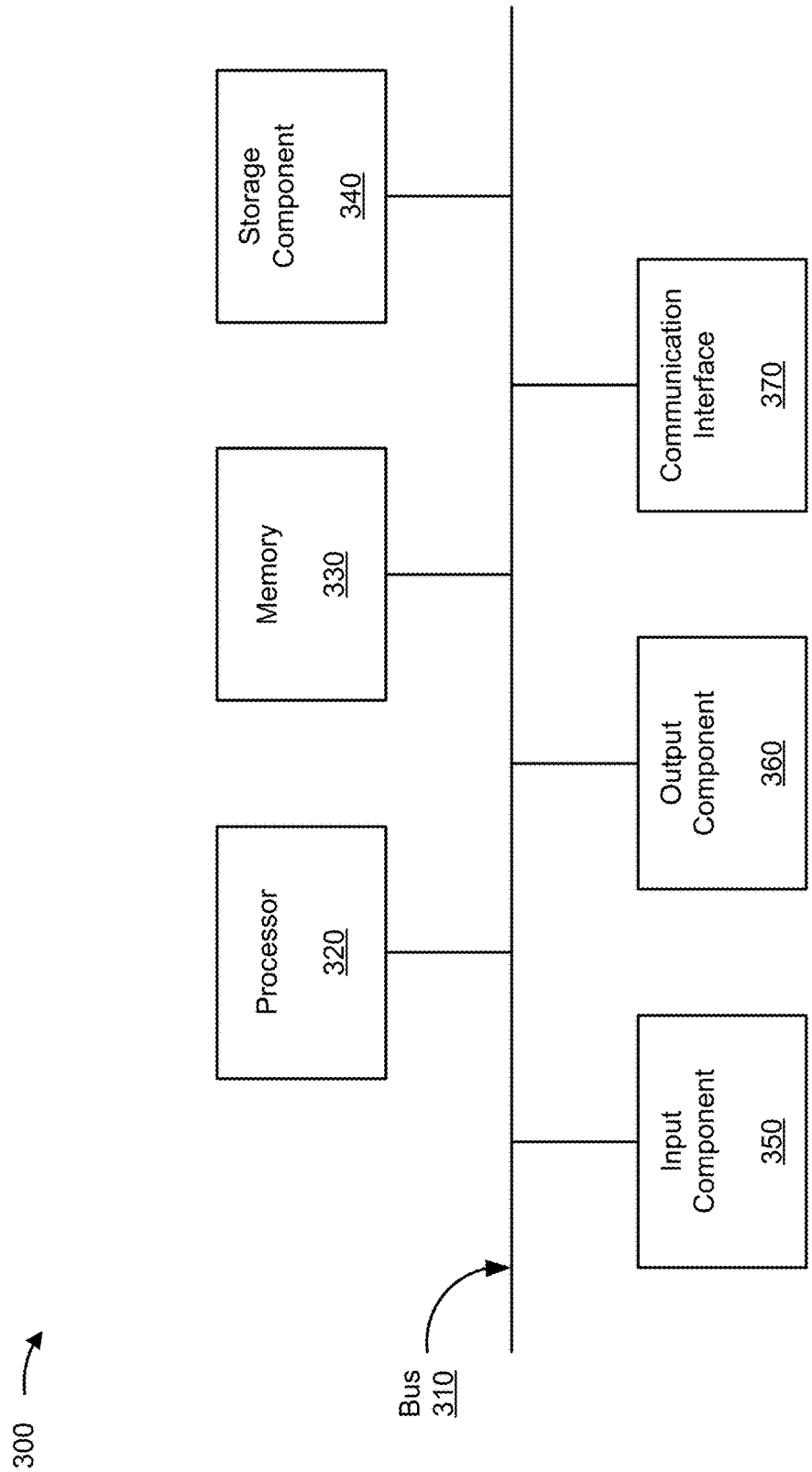
FIG. 3 is a diagram of example components of one or more devices of FIG. 2.

FIG. 3 is a diagram of example components of a device 300. Device 300 may correspond to vehicle 210, data storage device 220, and/or model training server 230. In some implementations, vehicle 210, data storage device 220, and/or model training server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
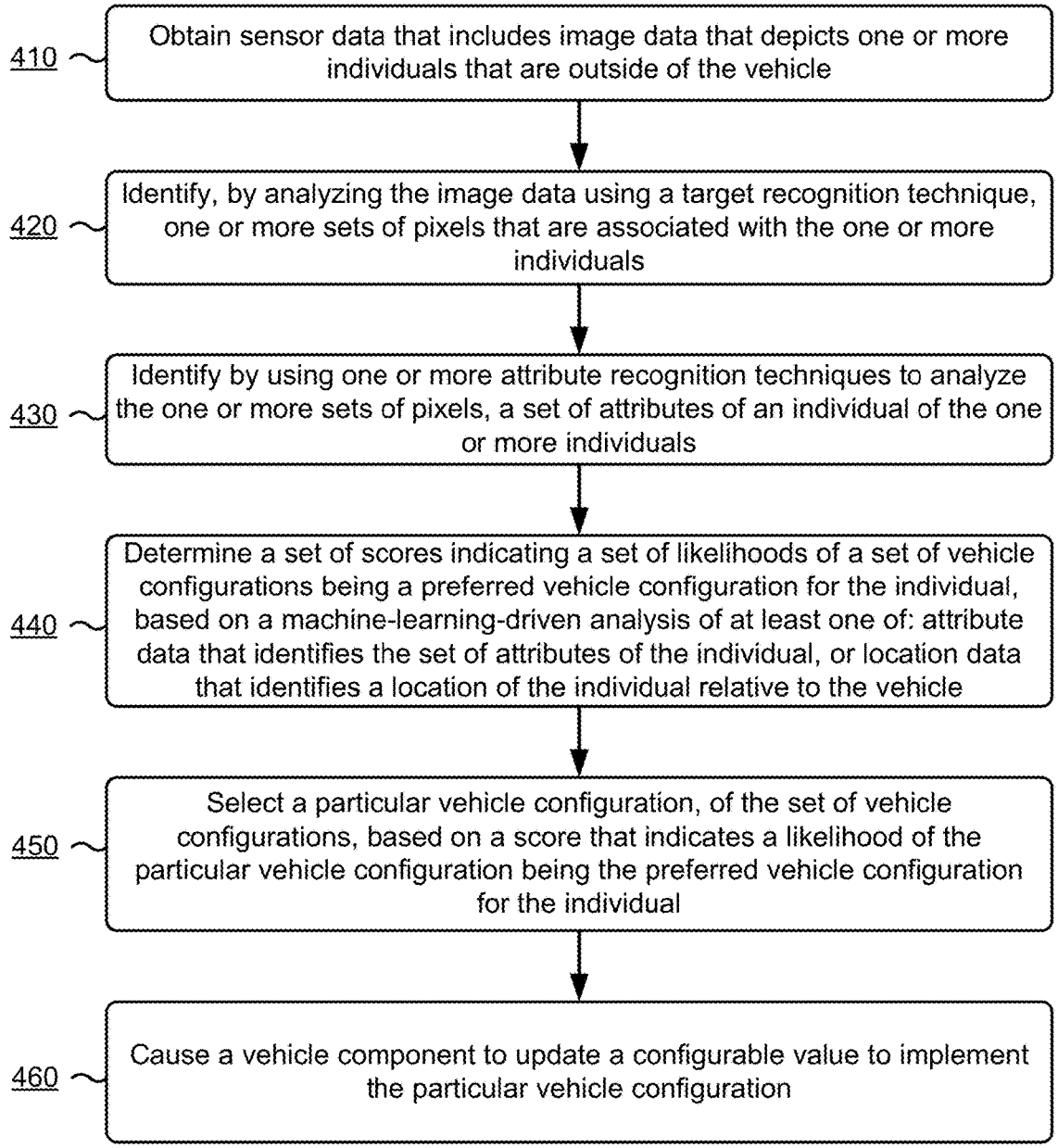
FIGS. 4-6 are flow charts of an example process for selecting and implementing a preferred vehicle configuration for one or more individuals that are approaching a vehicle.

FIG. 4 is a flow chart of an example process 400 for selecting and implementing a preferred vehicle configuration for one or more individuals that are approaching a vehicle. In some implementations, one or more process blocks of FIG. 4 may be performed by a vehicle (e.g., vehicle 210). In some implementations, one or more process blocks of FIG. 4 may be performed by another device or a group of devices separate from or including the vehicle, such as a model training server (e.g., model training server 220), and/or the like.

As shown in FIG. 4, process 400 may include obtaining sensor data that includes image data that depicts one or more individuals that are outside of the vehicle (block 410). For example, the vehicle (e.g., using processor 320, memory 330, storage component 340, input component 350, communication interface 370, and/or the like) may obtain sensor data that includes image data that depicts one or more individuals that are outside of the vehicle, as described above.

As further shown in FIG. 4, process 400 may include identifying, by analyzing the image data using a target recognition technique, one or more sets of pixels that are associated with the one or more individuals (block 420). For example, the vehicle (e.g., using processor 320, memory 330, storage component 340, input component 350, communication interface 370, and/or the like) may identify, by analyzing the image data using a target recognition technique, one or more sets of pixels that are associated with the one or more individuals, as described above.

As further shown in FIG. 4, process 400 may include identifying, by using one or more attribute recognition techniques to analyze the one or more sets of pixels, a set of attributes of an individual of the one or more individuals (block 430). For example, the vehicle (e.g., using processor 320, memory 330, storage component 340, and/or the like) may identify, by using one or more attribute recognition techniques to analyze the one or more sets of pixels, a set of attributes of an individual of the one or more individuals, as described above.

As further shown in FIG. 4, process 400 may include determining a set of scores indicating a set of likelihoods of a set of vehicle configurations being a preferred vehicle configuration for the individual, based on a machine-learning-driven analysis of at least one of: attribute data that identifies the set of attributes of the individual, or location data that identifies a location of the individual relative to the vehicle (block 440). For example, the vehicle (e.g., using processor 320, memory 330, storage component 340, and/or the like) may determine a set of scores indicating a set of likelihoods of a set of vehicle configurations being a preferred vehicle configuration for the individual, based on a machine-learning-driven analysis of attribute data that identifies the set of attributes of the individual, and/or location data that identifies a location of the individual relative to the vehicle, as described above.

As further shown in FIG. 4, process 400 may include selecting a particular vehicle configuration, of the set of vehicle configurations, based on a score that indicates a likelihood of the particular vehicle configuration being the preferred vehicle configuration for the individual (block 450). For example, the vehicle (e.g., using processor 320, memory 330, storage component 340, and/or the like) may select a particular vehicle configuration, of the set of vehicle configurations, based on a score that indicates a likelihood of the particular vehicle configuration being the preferred vehicle configuration for the individual, as described above.

As further shown in FIG. 4, process 400 may include causing a vehicle component to update a configurable value to implement the particular vehicle configuration (block 460). For example, the vehicle (e.g., using processor 320, memory 330, storage component 340, output component 360, communication interface 370, and/or the like) may cause a vehicle component to update a configurable value to implement the particular vehicle configuration, as described above.

Process 400 may include additional implementations, such as any single implementation or any combination of implementations described below and/or in connection with one or more other processes described elsewhere herein.

In some implementations, the vehicle may receive, from a key fob and via radio waves, an encoded signal that includes instructions to activate a set of sensors of the vehicle. In some implementations, the vehicle may power on the set of sensors based on receiving the encoded signal, and, when obtaining the sensor data, may use the set of sensors to capture the sensor data.

In some implementations, the particular vehicle configuration may include a door configuration instruction that indicates to open a vehicle door, a trunk configuration instruction that indicates to open a trunk of the vehicle, a seat configuration instruction that indicates to adjust a configuration of a seat of the vehicle, a temperature configuration instruction that indicates to set a temperature for an interior of the vehicle, and/or a radio configuration instruction that indicates to set a configuration of a radio of the vehicle.

In some implementations, the set of attributes may include an attribute that identifies a size of the individual. In some implementations, when causing the vehicle component to update the configurable value, the vehicle may provide, to a seat of the vehicle, a seat configuration instruction that indicates to modify a position of the seats based on the machine-learning-driven analysis of the attribute that identifies the size of the individual.

In some implementations, the sensor data may include body heat data that identifies a body heat reading associated with the individual, and/or weather data that includes values that measure one or more types of weather for an area in which the vehicle is located. In some implementations, when determining the set of scores, the vehicle may determine the set of scores based on the machine-learning-driven analysis being used to analyze two or more of: the attribute data, the body heat data, or the weather data. Additionally, when causing the vehicle component to update the configurable value, the vehicle may provide, to the vehicle component, a temperature configuration instruction that indicates to modify a temperature of an interior of the vehicle or a temperature of a seat of the vehicle.

In some implementations, when identifying the set of attributes, the vehicle may analyze the one or more sets of pixels using a facial recognition technique, and may identify one or more facial attributes, of the set of attributes, for the individual based on analyzing the one or more sets of pixels using the facial recognition technique. Additionally, the vehicle may compare the one or more facial attributes and a set of facial attributes associated with one or more registered users. In some implementations, the vehicle may determine whether the individual is a registered user, of the one or more registered users, based on comparing the one or more facial attributes and the set of facial attributes. Additionally, when determining the set of scores, the vehicle may determine the set of scores based on using the machine-learning-driven analysis to analyze user preferences data for the registered user.

In some implementations, when selecting the particular vehicle configuration, the vehicle may determine that the registered user is prohibited from accessing a feature of the vehicle, and may select, as the particular vehicle configuration, a vehicle configuration that prevents the feature from being made available to the registered user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
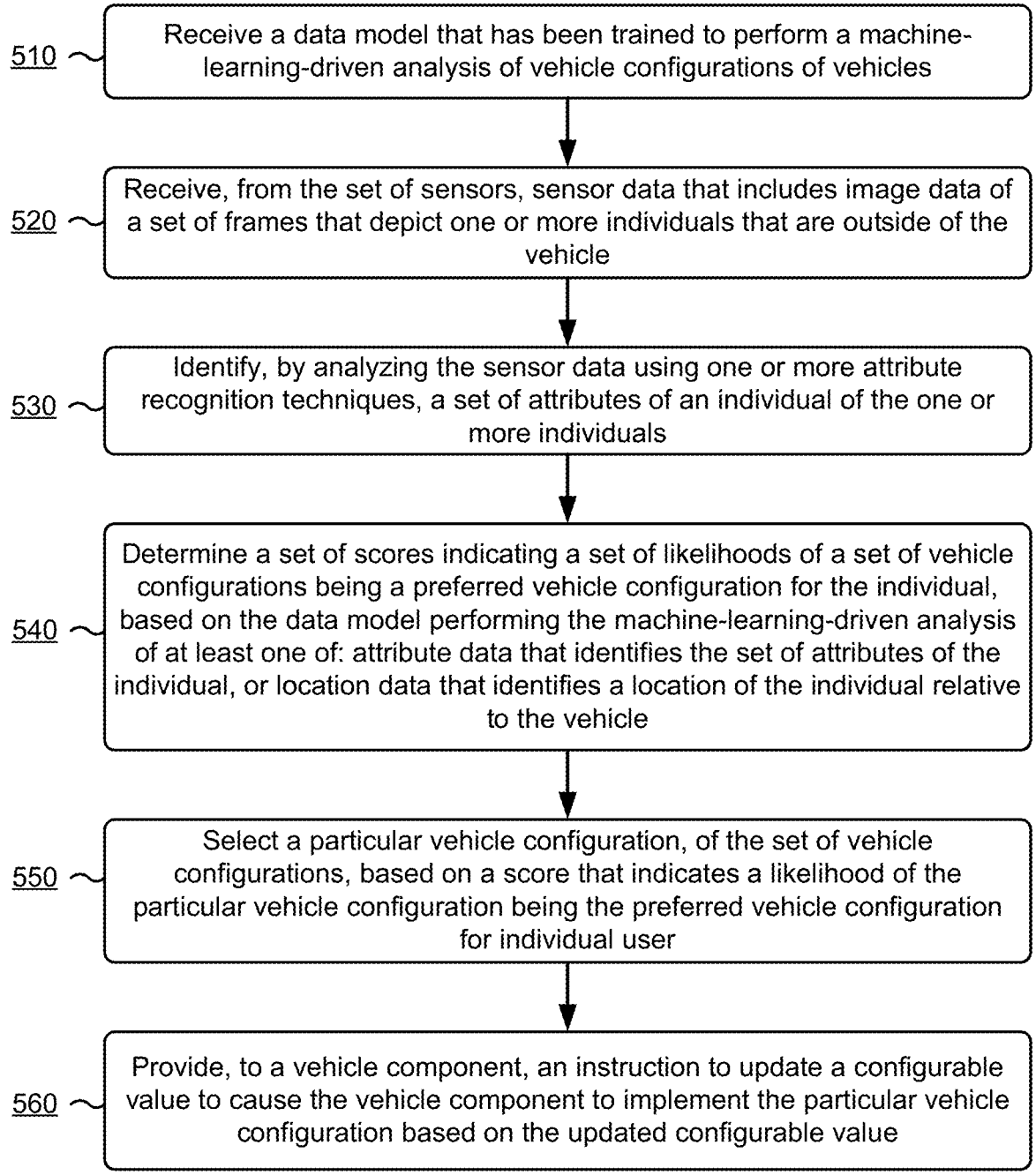

FIG. 5 is a flow chart of an example process 500 for selecting and implementing a preferred vehicle configuration for one or more individuals that are approaching a vehicle. In some implementations, one or more process blocks of FIG. 5 may be performed by a vehicle (e.g., vehicle 210). In some implementations, one or more process blocks of FIG. 5 may be performed by another device or a group of devices separate from or including the vehicle, such as a model training server (e.g., model training server 220), and/or the like. In some implementations, the vehicle may include a set of sensors.

As shown in FIG. 5, process 500 may include receiving a data model that has been trained to perform a machine-learning-driven analysis of vehicle configurations of a vehicle (block 510). For example, the vehicle (e.g., using processor 320, memory 330, storage component 340, input component 350, communication interface 370, and/or the like) may receive a data model that has been trained to perform a machine-learning-driven analysis of vehicle configurations of vehicles, as described above.

As further shown in FIG. 5, process 500 may include receiving, from the set of sensors, sensor data that includes image data of a set of frames that depict one or more individuals that are outside of the vehicle (block 520). For example, the vehicle (e.g., using processor 320, memory 330, storage component 340, input component 350, communication interface 370, and/or the like) may receive, from the set of sensors, sensor data that includes image data of a set of frames that depict one or more individuals that are outside of the vehicle, as described above.

As further shown in FIG. 5, process 500 may include identifying, by analyzing the sensor data using one or more attribute recognition techniques, a set of attributes of an individual of the one or more individuals (block 530). For example, the vehicle (e.g., using processor 320, memory 330, storage component 340, and/or the like) may identify, by analyzing the sensor data using one or more attribute recognition techniques, a set of attributes of an individual of the one or more individuals, as described above.

As further shown in FIG. 5, process 500 may include determining a set of scores indicating a set of likelihoods of a set of vehicle configurations being a preferred vehicle configuration for the individual, based on the data model performing the machine-learning-driven analysis of at least one of: attribute data that identifies the set of attributes of the individual, or location data that identifies a location of the individual relative to the vehicle (block 540). For example, the vehicle (e.g., using processor 320, memory 330, storage component 340, and/or the like) may determine a set of scores indicating a set of likelihoods of a set of vehicle configurations being a preferred vehicle configuration for the individual, based on the data model performing the machine-learning-driven analysis of attribute data that identifies the set of attributes of the individual, and/or location data that identifies a location of the individual relative to the vehicle, as described above.

As further shown in FIG. 5, process 500 may include selecting a particular vehicle configuration, of the set of vehicle configurations, based on a score that indicates a likelihood of the particular vehicle configuration being the preferred vehicle configuration for the user (block 550). For example, the vehicle (e.g., using processor 320, memory 330, storage component 340, and/or the like) may select a particular vehicle configuration, of the set of vehicle configurations, based on a score that indicates a likelihood of the particular vehicle configuration being the preferred vehicle configuration for the user, as described above.

As further shown in FIG. 5, process 500 may include providing, to a vehicle component, an instruction to update a configurable value to cause the vehicle component to implement the particular vehicle configuration based on the updated configurable value (block 560). For example, the vehicle (e.g., using processor 320, memory 330, storage component 340, input component 350, communication interface 370, and/or the like) may provide, to a vehicle component, an instruction to update a configurable value to cause the vehicle component to implement the particular vehicle configuration by updating the configurable value, as described above.

Process 500 may include additional implementations, such as any single implementation or any combination of implementations described below and/or in connection with one or more other processes described elsewhere herein.

In some implementations, the vehicle may receive, from a remote starter component and via radio waves, an encoded signal that includes an instruction to activate the set of sensors of the vehicle. In some implementations, the vehicle may power on the set of sensors, based on receiving the encoded signal, to cause the set of sensors to collect the sensor data and to provide the sensor data to the one or more processors.

In some implementations, the particular vehicle configuration may include a door configuration instruction that indicates to open a vehicle door, a trunk configuration instruction that indicates to open a trunk of the vehicle, a seat configuration instruction that indicates to adjust a configuration of a seat of the vehicle, a temperature configuration instruction that indicates to set a temperature for an interior of the vehicle, and/or a radio configuration instruction that indicates to set a configuration of a radio of the vehicle.

In some implementations, the set of attributes may include an attribute that identifies a size of the individual. In some implementations, when providing the instruction to the vehicle component, the vehicle may provide, to a seat of the vehicle, a seat configuration instruction that indicates to modify a position of the seat based on the data model performing the machine-learning-driven analysis of the attribute that identifies the size of the individual.

In some implementations, when receiving the sensor data, the vehicle may receive, as part of the sensor data, weather data that include values that measure one or more types of weather in an area in which the vehicle is located, and, when determining the set of scores, the vehicle may determine the set of scores based on the data model performing the machine-learning-driven analysis to analyze the sensor data that includes the weather data. Additionally, when providing the instruction to the vehicle component, the vehicle may provide, to the vehicle component, an instruction to modify a temperature of an interior of the vehicle or a temperature of a seat of the vehicle.

In some implementations, when identifying the set of attributes, the vehicle may analyze the image data using a gait analysis technique, and may identify one or more gait attributes, of the set of attributes, for the individual based on analyzing the image data using the gait analysis technique. Additionally, the vehicle may determine that the individual is a registered user based on an analysis of the one or more gait attributes, and, when determining the set of scores, the vehicle may determine the set of scores based on the data model performing the machine-learning-driven analysis to analyze user preferences data for the registered user.

In some implementations, the set of attributes may include an attribute that identifies that the individual is carrying one or more objects, and, when providing the instruction to the vehicle component, the vehicle may provide, to a trunk of the vehicle, a trunk configuration instruction that indicates to open the trunk based on the data model performing the machine-learning-driven analysis of the attribute that identifies that the individual is carrying one or more objects.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
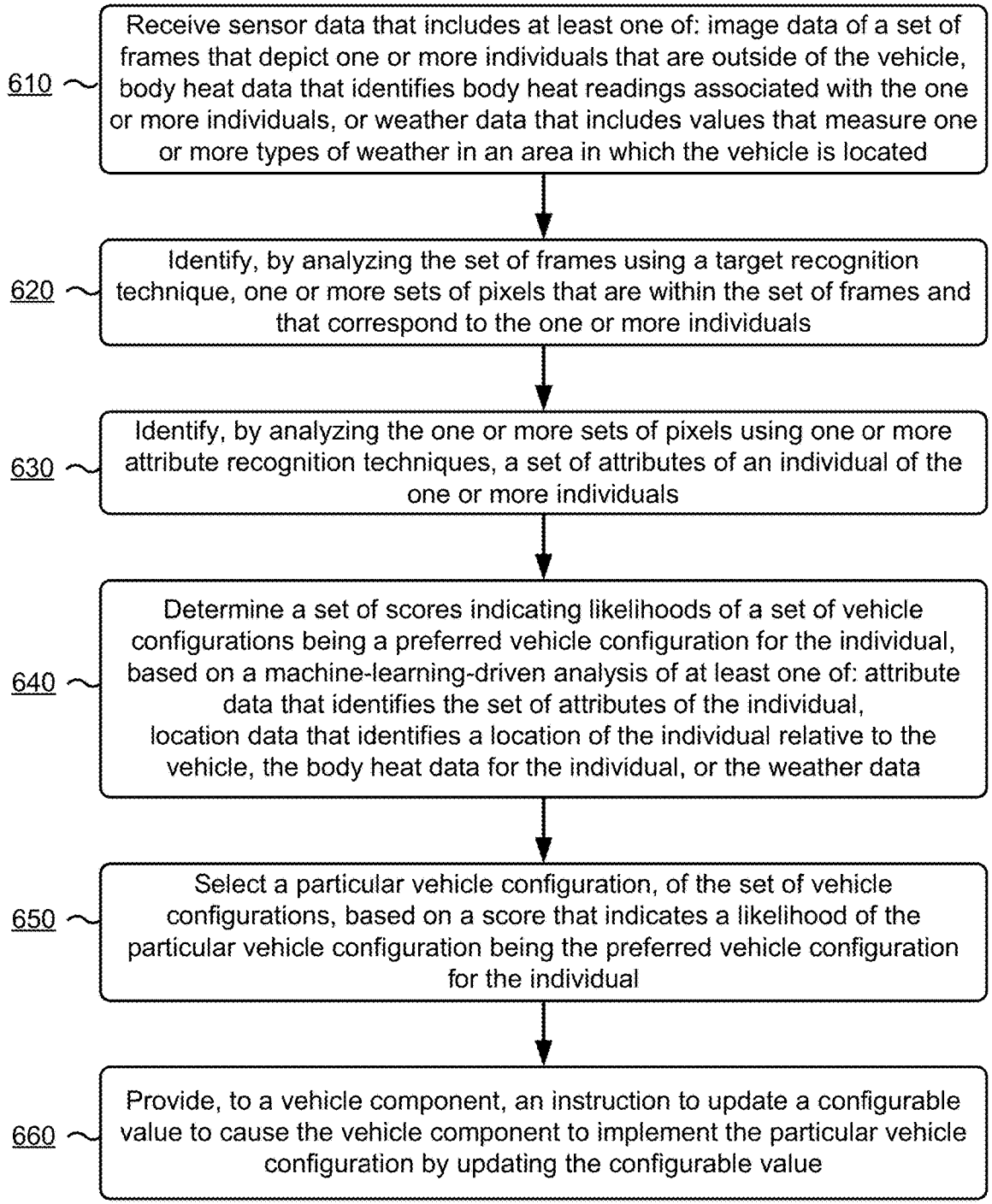

FIG. 6 is a flow chart of an example process 600 for selecting and implementing a preferred vehicle configuration for one or more individuals that are approaching a vehicle. In some implementations, one or more process blocks of FIG. 6 may be performed by a vehicle (e.g., vehicle 210). In some implementations, one or more process blocks of FIG. 6 may be performed by another device or a group of devices separate from or including the vehicle, such as a model training server (e.g., model training server 220), and/or the like.

As shown in FIG. 6, process 600 may include receiving sensor data that includes at least one of: image data of a set of frames that depict one or more individuals that are outside of the vehicle, body heat data that identifies body heat readings associated with the one or more individuals, or weather data that includes values that measure one or more types of weather in an area in which the vehicle is located (block 610). For example, the vehicle (e.g., using processor 320, memory 330, storage component 340, input component 350, communication interface 370, and/or the like) may receive sensor data that includes image data of a set of frames that depict one or more individuals that are outside of the vehicle, body heat data that identifies body heat readings associated with the one or more individuals, and/or weather data that includes values that measure one or more types of weather in an area in which the vehicle is located, as described above.

As further shown in FIG. 6, process 600 may include identifying, by analyzing the set of frames using a target recognition technique, one or more sets of pixels that are within the set of frames and that correspond to the one or more individuals (block 620). For example, the vehicle (e.g., using processor 320, memory 330, storage component 340, input component 350, communication interface 370, and/or the like) may identify, by analyzing the set of frames using a target recognition technique, one or more sets of pixels that are within the set of frames and that correspond to the one or more individuals, as described above.

As further shown in FIG. 6, process 600 may include identifying, by analyzing the one or more sets of pixels using one or more attribute recognition techniques, a set of attributes of an individual of the one or more individuals (block 630). For example, the vehicle (e.g., using processor 320, memory 330, storage component 340, and/or the like) may identify, by analyzing the one or more sets of pixels using one or more attribute recognition techniques, a set of attributes of an individual of the one or more individuals, as described above.

As further shown in FIG. 6, process 600 may include determining a set of scores indicating likelihoods of a set of vehicle configurations being a preferred vehicle configuration for the individual, based on a machine-learning-driven analysis of at least one of: attribute data that identifies the set of attributes of the individual, location data that identifies a location of the individual relative to the vehicle, the body heat data for the individual, or the weather data (block 640). For example, the vehicle (e.g., using processor 320, memory 330, storage component 340, and/or the like) may determine a set of scores indicating likelihoods of a set of vehicle configurations being a preferred vehicle configuration for the individual, based on a machine-learning-driven analysis of attribute data that identifies the set of attributes of the individual, location data that identifies a location of the individual relative to the vehicle, the body heat data for the individual, and/or the weather data, as described above.

As further shown in FIG. 6, process 600 may include selecting a particular vehicle configuration, of the set of vehicle configurations, based on a score that indicates a likelihood of the particular vehicle configuration being the preferred vehicle configuration for the individual (block 650). For example, the vehicle (e.g., using processor 320, memory 330, storage component 340, and/or the like) may select a particular vehicle configuration, of the set of vehicle configurations, based on a score that indicates a likelihood of the particular vehicle configuration being the preferred vehicle configuration for the individual, as described above.

As further shown in FIG. 6, process 600 may include providing, to a vehicle component, an instruction to update a configurable value to cause the vehicle component to implement the particular vehicle configuration by updating the configurable value (block 660). For example, the vehicle (e.g., using processor 320, memory 330, storage component 340, output component 360, communication interface 370, and/or the like) may provide to a vehicle component, an instruction to update a configurable value to cause the vehicle component to implement the particular vehicle configuration by updating the configurable value, as described above.

Process 600 may include additional implementations, such as any single implementation or any combination of implementations described below and/or in connection with one or more other processes described elsewhere herein.

In some implementations, the vehicle may detect a key fob within a threshold proximity of the vehicle, and may power on a set of sensors, associated with the vehicle, based on detecting the key fob, and, when receiving the sensor data, the vehicle may receive the sensor data from the set of sensors. In some implementations, when determining the set of scores, the vehicle may determine the set of scores by providing, as input values to a data model at least two of: the attribute data, the location data, the body heat data, or the weather data, where the data model has been trained on historical vehicle configuration data and historical vehicle occupant data and uses one or more machine learning techniques to determine the set of scores.

In some implementations, the particular vehicle configuration may include a door configuration instruction that indicates to open a vehicle door, a vehicle configuration instruction that indicates to open a trunk of the vehicle, a seat configuration instruction that indicates to adjust a configuration of a seat of the vehicle, a temperature configuration instruction that indicates to set a temperature for an interior of the vehicle, and/or a radio configuration instruction that indicates to set a configuration of a radio of the vehicle. In some implementations, when providing the instruction to the vehicle component, the vehicle may provide, to vehicle door, a door configuration instruction that indicates to open the door for the individual.

In some implementations, the sensor data may include the image data and the weather data, and, when determining the set of scores, the vehicle may determine the set of scores based on the machine-learning-driven analysis of the attribute data, the location data, and the weather data. Additionally, when providing the instruction to update the configurable value, the vehicle may provide, to the vehicle component, an instruction to update the configurable value based on the machine-learning-driven analysis of the attribute data, the location data, and the weather data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a processor on-board a vehicle, sensor data that includes image data that depicts one or more individuals that are outside of the vehicle;
    identifying, by the processor and by analyzing the image data using a target recognition technique, one or more sets of pixels that are associated with the one or more individuals;
    identifying, by the processor and by using one or more attribute recognition techniques to analyze the one or more sets of pixels, a set of attributes of an individual of the one or more individuals;
    determining, by the processor, a set of scores indicating a set of likelihoods of a set of vehicle configurations being a preferred vehicle configuration for the individual, based on a machine-learning-driven analysis of at least one of:
        attribute data that identifies the set of attributes of the individual, or
        location data that identifies a location of the individual relative to the vehicle;
    selecting, by the processor, a particular vehicle configuration, of the set of vehicle configurations, based on a score that indicates a likelihood of the particular vehicle configuration being the preferred vehicle configuration for the individual; and
    causing, by the processor, a vehicle component to update a configurable value to implement the particular vehicle configuration.

2. The method of claim 1, further comprising:
    receiving, from an access device and via radio waves, an encoded signal that includes instructions to activate a set of sensors of the vehicle;
    powering on the set of sensors based on receiving the encoded signal; and
    wherein obtaining the sensor data comprises:
        using the set of sensors to capture the sensor data.

3. The method of claim 1, wherein the particular vehicle configuration includes at least one of:
    a door configuration instruction that indicates to open a vehicle door,
    a trunk configuration instruction that indicates to open a trunk of the vehicle,
    a seat configuration instruction that indicates to adjust a configuration of a seat of the vehicle,
    a temperature configuration instruction that indicates to set a temperature for an interior of the vehicle, or
    a radio configuration instruction that indicates to set a configuration of a radio of the vehicle.

4. The method of claim 1, wherein the set of attributes include an attribute that identifies a size of the individual; and
    wherein causing the vehicle component to update the configurable value comprises:
        providing, to a seat of the vehicle, a seat configuration instruction that indicates to modify a position of the seat based on the machine-learning-driven analysis of the attribute that identifies the size of the individual.

5. The method of claim 1, wherein the sensor data includes at least one of:
- body heat data that identifies a body heat reading associated with the individual, or
- weather data that includes values that measure one or more types of weather in an area in which the vehicle is located; and wherein determining the set of scores comprises:
- determining the set of scores based on the machine-learning-driven analysis being used to analyze two or more of:
  - the attribute data,
  - the body heat data, or
  - the weather data; and wherein causing the vehicle component to update the configurable value comprises:
- providing, to the vehicle component, a temperature configuration instruction that indicates to modify a temperature of an interior of the vehicle or a temperature of a seat of the vehicle.

6. The method of claim 1, wherein identifying the set of attributes comprises:
- analyzing the one or more sets of pixels using a facial recognition technique, and
- identifying one or more facial attributes, of the set of attributes, for the individual based on analyzing the one or more sets of pixels using the facial recognition technique;

wherein the method further comprises:
- comparing the one or more facial attributes and a set of facial attributes associated with one or more registered users, and
- determining whether the individual is a registered user, of the one or more registered users, based on comparing the one or more facial attributes and the set of facial attributes; and wherein determining the set of scores comprises:
- determining the set of scores based on using the machine-learning-driven analysis to analyze user preferences data for the registered user.

7. The method of claim 6, wherein selecting the particular vehicle configuration comprises:
- determining that the registered user is prohibited from accessing a feature of the vehicle, and
- selecting, as the particular vehicle configuration, a vehicle configuration that prevents the feature from being made available to the registered user.

8. A system, comprising:
one or more memories; and
one or more processors, operatively coupled to the one or more memories and a set of sensors, configured to:
- receive a data model that has been trained to perform a machine-learning-driven analysis of vehicle configurations of vehicles;
- receive, from the set of sensors, sensor data that includes image data of a set of frames that depict one or more individuals that are outside of a vehicle;
- identify, by analyzing the sensor data using one or more attribute recognition techniques, a set of attributes of an individual of the one or more individuals;
- determine a set of scores indicating a set of likelihoods of a set of vehicle configurations being a preferred vehicle configuration for the individual, based on the data model performing the machine-learning-driven analysis of at least one of:
  - attribute data that identifies the set of attributes of the individual, or
  - location data that identifies a location of the individual relative to the vehicle;
- select a particular vehicle configuration, of the set of vehicle configurations, based on a score that indicates a likelihood of the particular vehicle configuration being the preferred vehicle configuration for individual user; and
- provide, to a vehicle component, an instruction to update a configurable value to cause the vehicle component to implement the particular vehicle configuration based on the updated configurable value.

9. The system of claim 8, wherein the one or more processors are further configured to:
- receive, from a remote starter component and via radio waves, an encoded signal that includes an instruction to activate the set of sensors of the vehicle; and
- power on the set of sensors, based on receiving the encoded signal, to cause the set of sensors to collect the sensor data and to provide the sensor data to the one or more processors.

10. The system of claim 8, wherein the particular vehicle configuration includes at least one of:
- a door configuration instruction that indicates to open a vehicle door,
- a trunk configuration instruction that indicates to open a trunk of the vehicle,
- a seat configuration instruction that indicates to adjust a configuration of a seat of the vehicle,
- a temperature configuration instruction that indicates to set a temperature for an interior of the vehicle, or
- a radio configuration instruction that indicates to set a configuration of a radio of the vehicle.

11. The system of claim 8, wherein the set of attributes include an attribute that identifies a size of the individual; and
wherein the one or more processors, when providing the instruction to the vehicle component, are to:
- provide, to a seat of the vehicle, a seat configuration instruction that indicates to modify a position of the seat based on the data model performing the machine-learning-driven analysis of the attribute that identifies the size of the individual.

12. The system of claim 8, wherein the one or more processors, when receiving the sensor data, are to:
- receive, as part of the sensor data, weather data that includes values that measure one or more types of weather in which the vehicle is located;

wherein the one or more processors, when determining the set of scores, are to:
- determine the set of scores based on the data model performing the machine-learning-driven analysis to analyze the sensor data that includes the weather data; and wherein the one or more processors, when providing the instruction to the vehicle component, are to:
- provide, to the vehicle component, an instruction to modify a temperature of an interior of the vehicle or a temperature of a seat of the vehicle.

13. The system of claim 8, wherein the one or more processors, when identifying the set of attributes, are to:
- analyze the image data using a gait analysis technique, and
- identify one or more gait attributes, of the set of attributes, for the individual based on analyzing the image data using the gait analysis technique;

wherein the one or more processors are further to:
  determine that the individual is a registered user based on an analysis of the one or more gait attributes; and
wherein the one or more processors, when determining the set of scores, are to:
  determine the set of scores based on the data model performing the machine-learning-driven analysis to analyze user preferences data for the registered user.

14. The system of claim 8, wherein the set of attributes include an attribute that identifies that the individual is carrying one or more objects; and
  wherein the one or more processors, when providing the instruction to the vehicle component, are to:
    provide, to a trunk of the vehicle, a trunk configuration instruction that indicates to open the trunk based on the data model performing the machine-learning-driven analysis of the attribute that identifies that the individual is carrying one or more objects.

15. A non-transitory computer-readable medium storing instructions, the instructions comprising:
  one or more instructions that, when executed by one or more processors of a vehicle, cause the one or more processors to:
    receive sensor data that includes at least one of:
      image data of a set of frames that depict one or more individuals that are outside of the vehicle,
      body heat data that identifies body heat readings associated with the one or more individuals, or
      weather data that includes values that measure one or more types of weather in an area in which the vehicle is located;
    identify, by analyzing the set of frames using a target recognition technique, one or more sets of pixels that are within the set of frames and that correspond to the one or more individuals;
    identify, by analyzing the one or more sets of pixels using one or more attribute recognition techniques, a set of attributes of an individual of the one or more individuals;
    determine a set of scores indicating likelihoods of a set of vehicle configurations being a preferred vehicle configuration for the individual, based on a machine-learning-driven analysis of at least one of:
      attribute data that identifies the set of attributes of the individual,
      location data that identifies a location of the individual relative to the vehicle,
      the body heat data for the individual, or
      the weather data;
    select a particular vehicle configuration, of the set of vehicle configurations, based on a score that indicates a likelihood of the particular vehicle configuration being the preferred vehicle configuration for the individual; and
    provide, to a vehicle component, an instruction to update a configurable value to cause the vehicle component to implement the particular vehicle configuration by updating the configurable value.

16. The non-transitory computer-readable medium of claim 15, wherein the one or more instructions, when executed by the one or more processors, further cause the one or more processors to:
    detect a key fob within a threshold proximity of the vehicle; and
    power on a set of sensors, associated with the vehicle, based on detecting the key fob; and
  wherein the one or more instructions, that cause the one or more processors to receive the sensor data, cause the one or more processors to:
    receive the sensor data from the set of sensors.

17. The non-transitory computer-readable medium of claim 15, wherein the one or more instructions, that cause the one or more processors to determine the set of scores, cause the one or more processors to:
    determine the set of scores by providing, as input values to a data model at least two of:
      the attribute data,
      the location data,
      the body heat data, or
      the weather data,
      wherein the data model has been trained on historical vehicle configuration data and historical vehicle occupant data and uses one or more machine learning techniques to determine the set of scores.

18. The non-transitory computer-readable medium of claim 15, wherein the particular vehicle configuration includes at least one of:
    a door configuration instruction that indicates to open a vehicle door,
    a trunk configuration instruction that indicates to open a trunk of the vehicle,
    a seat configuration instruction that indicates to adjust a configuration of a seat of the vehicle,
    a temperature configuration instruction that indicates to set a temperature for an interior of the vehicle, or
    a radio configuration instruction that indicates to set a configuration of a radio of the vehicle.

19. The non-transitory computer-readable medium of claim 15, wherein the one or more processors, when providing the instruction to the vehicle component, are to:
    provide, to a vehicle door, a door configuration instruction that indicates to open the door for the individual.

20. The non-transitory computer-readable medium of claim 15, wherein the sensor data includes the image data and the weather data;
  wherein the one or more instructions, that cause the one or more processors to determine the set of scores, cause the one or more processors to:
    determine the set of scores based on the machine-learning-driven analysis of:
      the attribute data,
      the location data, and
      the weather data; and
  wherein the one or more instructions, that cause the one or more processors to provide the instruction to update the configurable value, cause the one or more processors to:
    provide, to the vehicle component, an instruction to update the configurable value based on the machine-learning-driven analysis of the attribute data, the location data, and the weather data.

* * * * *